(12) United States Patent
Park et al.

(10) Patent No.: US 11,095,911 B2
(45) Date of Patent: Aug. 17, 2021

(54) METHOD AND APPARATUS FOR ENCODING IMAGE

(71) Applicant: SAMSUNG ELECTRONICS CO., LTD., Suwon-si (KR)

(72) Inventors: Min-woo Park, Yongin-si (KR); Bo-ra Jin, Yongin si (KR); In-kwon Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 154 days.

(21) Appl. No.: 15/998,658

(22) PCT Filed: Feb. 15, 2017

(86) PCT No.: PCT/KR2017/001644
§ 371 (c)(1),
(2) Date: Aug. 16, 2018

(87) PCT Pub. No.: WO2017/142301
PCT Pub. Date: Aug. 24, 2017

(65) Prior Publication Data
US 2020/0336753 A1  Oct. 22, 2020

Related U.S. Application Data

(60) Provisional application No. 62/295,669, filed on Feb. 16, 2016.

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/117* (2014.11);
(Continued)

(58) Field of Classification Search
CPC .... H04N 19/44; H04N 19/172; H04N 19/159; H04N 19/105; H04N 19/132; H04N 19/117
(Continued)

(56) References Cited

U.S. PATENT DOCUMENTS

2008/0101465 A1* 5/2008 Chono ................. H04N 19/124
375/240.03
2011/0038415 A1* 2/2011 Min ....................... H04N 19/82
375/240.12
(Continued)

FOREIGN PATENT DOCUMENTS

JP         5234241 B2    7/2013
KR   10-2014-0007097 A   1/2014
(Continued)

OTHER PUBLICATIONS

Doshkov et al., Towards Efficient Intra Prediction Based on Image Inpainting Methods, Dec. 8, 2010, 28th Picture Coding Symposium, PCS2010, pp. 470-473.*
(Continued)

*Primary Examiner* — Marnie A Matt
(74) *Attorney, Agent, or Firm* — Sughrue Mion, PLLC

(57) ABSTRACT

Provided is a method of decoding an image, the method including: determining at least one prediction unit included in a current frame that is one of at least one frame forming the image; determining a reference region to be referred to by a current prediction unit that is one of the at least one prediction unit; changing a sample value included in at least one of the current prediction unit and the reference region, based on an analyzing result of a sample value of the reference region; determining a sample value included in the current prediction unit, based on a result of changing the
(Continued)

sample value; and decoding the image based on the determined sample value of the current prediction unit.

1 Claim, 28 Drawing Sheets

(51) Int. Cl.
*H04N 19/117* (2014.01)
*H04N 19/132* (2014.01)
*H04N 19/159* (2014.01)
*H04N 19/172* (2014.01)
*H04N 19/136* (2014.01)
*H04N 19/176* (2014.01)
*H04N 19/593* (2014.01)

(52) U.S. Cl.
CPC ......... *H04N 19/132* (2014.11); *H04N 19/159* (2014.11); *H04N 19/172* (2014.11); *H04N 19/136* (2014.11); *H04N 19/176* (2014.11); *H04N 19/593* (2014.11)

(58) Field of Classification Search
USPC .................................................. 375/240.25
See application file for complete search history.

(56) References Cited

U.S. PATENT DOCUMENTS

| | | | | |
|---|---|---|---|---|
| 2012/0020580 A1* | 1/2012 | Sasai | ...................... | H04N 19/14 |
| | | | | 382/233 |
| 2012/0195378 A1 | 8/2012 | Zheng et al. | | |
| 2013/0003832 A1 | 1/2013 | Li et al. | | |
| 2013/0101032 A1* | 4/2013 | Wittmann | .............. | H04N 19/80 |
| | | | | 375/240.12 |
| 2013/0114690 A1 | 5/2013 | Chono et al. | | |
| 2014/0056352 A1 | 2/2014 | Park et al. | | |
| 2014/0086323 A1* | 3/2014 | Chuang | ................ | H04N 19/593 |
| | | | | 375/240.12 |
| 2014/0133558 A1* | 5/2014 | Seregin | ................ | H04N 19/593 |
| | | | | 375/240.12 |
| 2015/0139298 A1* | 5/2015 | Seregin | ................ | H04N 19/109 |
| | | | | 375/240.02 |
| 2015/0381985 A1* | 12/2015 | Oh | ........................ | H04N 19/124 |
| | | | | 375/240.03 |
| 2016/0044337 A1* | 2/2016 | Lee | ........................ | H04N 19/157 |
| | | | | 375/240.12 |
| 2016/0134866 A1* | 5/2016 | Budagavi | ............... | H04N 19/80 |
| | | | | 375/240.12 |
| 2018/0295384 A1* | 10/2018 | Son | ....................... | H04N 19/182 |

FOREIGN PATENT DOCUMENTS

| | | |
|---|---|---|
| KR | 10-2014-0129421 A | 11/2014 |
| KR | 10-2015-0038688 A | 4/2015 |
| KR | 10-2015-0084408 A | 7/2015 |
| WO | 2017/091001 A1 | 6/2017 |
| WO | WO-2017142301 A1 * | 8/2017 ........... H04N 19/109 |

OTHER PUBLICATIONS

Search Report and Written Opinion dated May 23, 2017, issued by the International Searching Authority in International Application No. PCT/KR2017/001644 (PCT/ISA/210 & PCT/ISA/237).
Potapov et al., "What could be after HEVC?", 2013 9$^{th}$ International Conference on Information, Communications & Signal Processing, IEEE, Dec. 10, 2013,, 5 total pages, XP032584493.
Communication dated Dec. 19, 2018 issued by the European Intellectual Property Office in counterpart European Application No. 17753462.5.

* cited by examiner

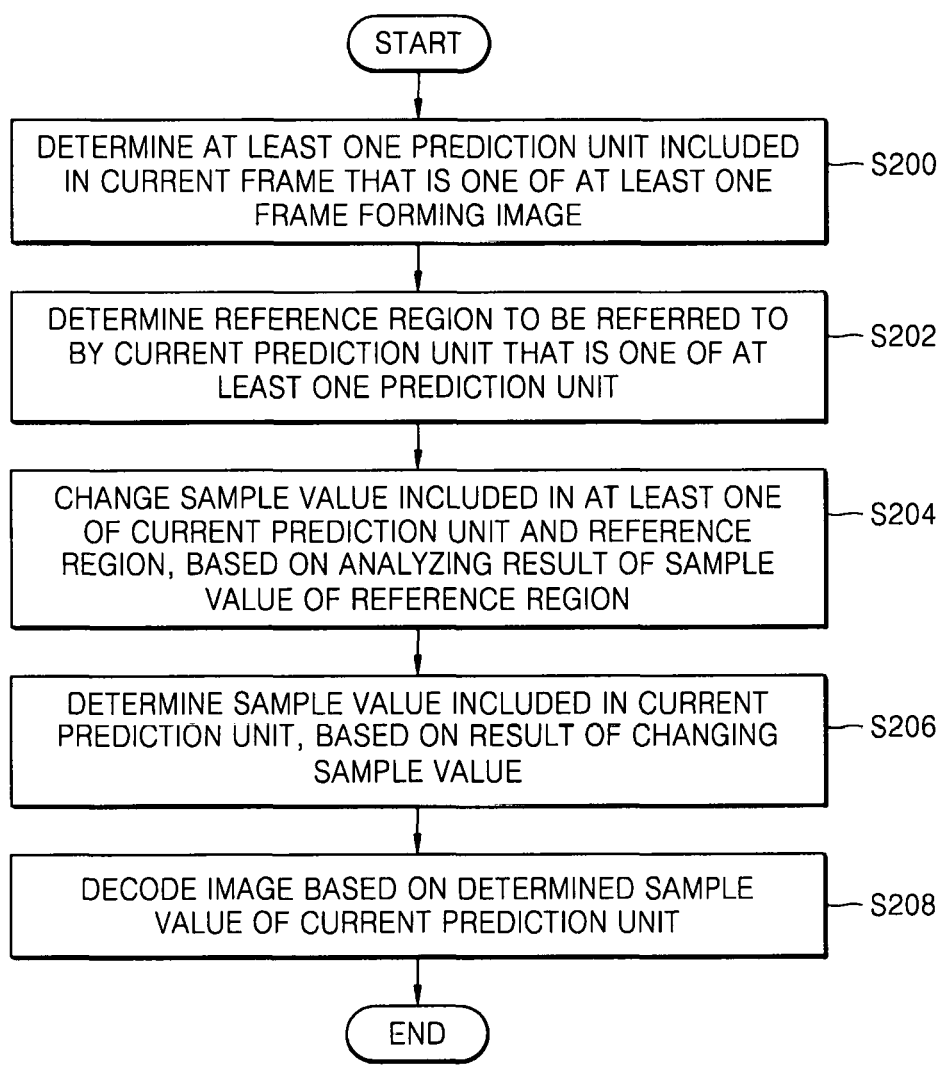

FIG. 5B
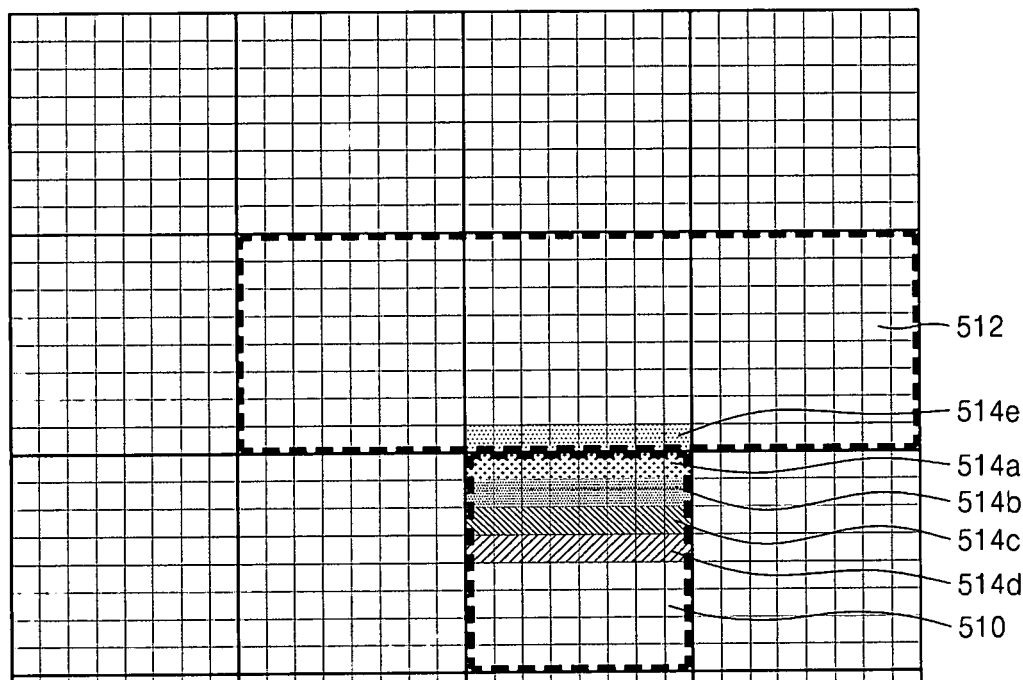
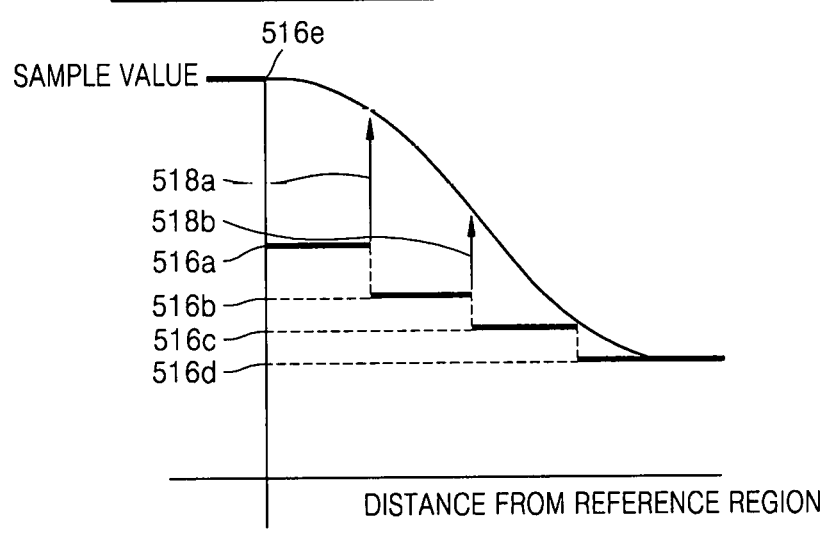

FIG. 11
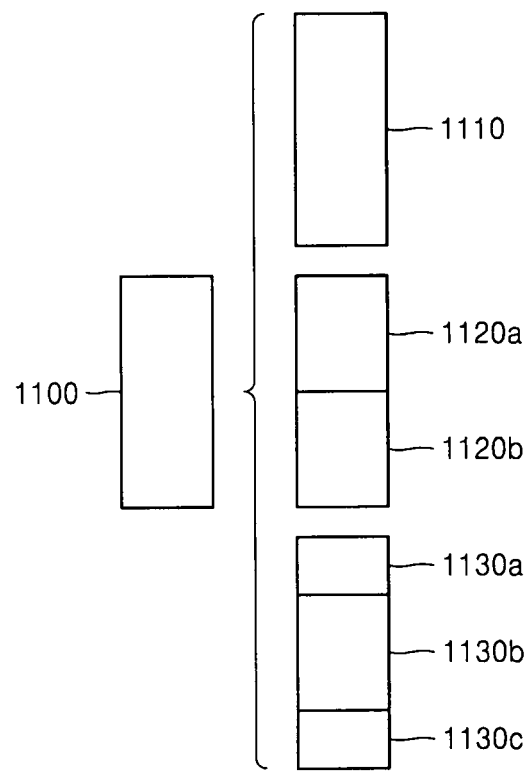
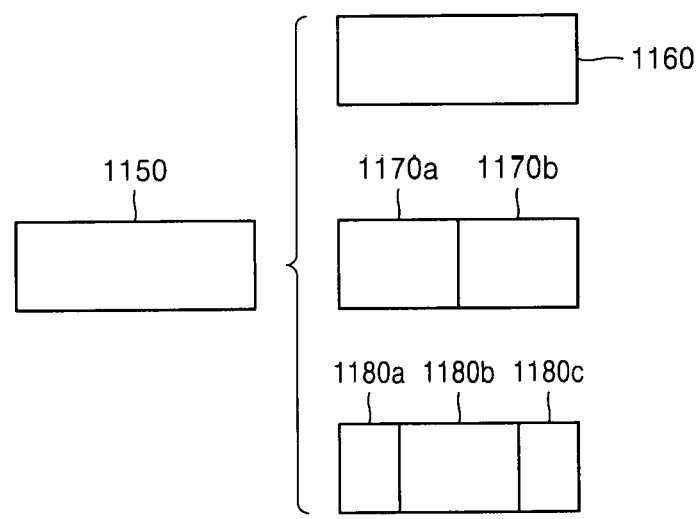

FIG. 20

| BLOCK TYPE / DEPTH | 0: SQUARE | 1: NS_VER | 2: NS_HOR |
|---|---|---|---|
| DEPTH D | 2000 □ | □—2010 | 2020 □ |
| DEPTH D+1 | □—2002 | □—2012 | □—2022 |
| DEPTH D+2 | □—2004 | □—2014 | □—2024 |
| ... | ... | ... | ... |

METHOD AND APPARATUS FOR ENCODING IMAGE

TECHNICAL FIELD

A method and apparatus according to an embodiment are for efficiently performing prediction during an encoding or decoding process of an image.

BACKGROUND ART

Image data is encoded using a codec according to a certain data compression standard, for example, the moving picture expert group (MPEG) standard, and then is stored in a recording medium or transmitted through a communication channel in the form of a bitstream.

With the development and supply of hardware capable of reproducing and storing high resolution or high definition image content, the necessity for a codec that effectively encodes or decodes the high resolution or high definition image content is increasing. Encoded image content may be reproduced by being decoded. Recently, methods for effectively compressing such high resolution or high definition image content have been executed. For example, an efficient image processing method is implemented by processing an image to be encoded or decoded via an arbitrary method.

DESCRIPTION OF EMBODIMENTS

Technical Problem

According to conventional technology, in which mode, among a plurality of intra prediction modes, prediction is to be performed during an encoding or decoding process of an image may be determined based on a prediction unit. In prediction units where prediction modes are determined to be the same, intra prediction is performed via a same method, and prediction is performed regardless of a characteristic of a reference region.

Also, a process of selecting a prediction mode is performed by expressing all prediction modes in a same probability (for example, by performing fixed length coding) without distinction of a prediction mode practically used the most in a picture from among intra prediction modes, and such a method causes encoding and decoding processes to be inefficiently performed.

Solution to Problem

According to an aspect of the present disclosure, a method of decoding an image, the method includes: determining at least one prediction unit included in a current frame that is one of at least one frame forming the image; determining a reference region to be referred to by a current prediction unit that is one of the at least one prediction unit; changing a sample value included in at least one of the current prediction unit and the reference region, based on an analyzing result of a sample value of the reference region; determining a sample value included in the current prediction unit, based on a result of changing the sample value; and decoding the image based on the determined sample value of the current prediction unit.

According to another aspect of the present disclosure, an apparatus for decoding an image, the apparatus includes: a prediction unit determiner configured to determine at least one prediction unit included in a current frame that is one of at least one frame forming the image; and a decoder configured to determine a reference region to be referred to by a current prediction unit that is one of the at least one prediction unit, change a sample value included in at least one of the current prediction unit and the reference region, based on an analyzing result of a sample value of the reference region, determine a sample value included in the current prediction unit, based on a result changing the sample value, and decode the image based on the determined sample value of the current prediction unit.

According to another aspect of the present disclosure, a computer-readable recording medium has recorded thereon a computer program performing the method.

Advantageous Effects of Disclosure

According to various embodiments, encoding or decoding efficiency can be improved by effectively determining an intra prediction method to be performed during an encoding or decoding process of an image.

BRIEF DESCRIPTION OF DRAWINGS

FIG. 2 is a flowchart of processes by which an image encoding apparatus determines a sample value included in a current prediction unit, based on an analyzing result of a reference region, and encodes an image.

FIG. 5B illustrates processes of performing filtering so as to change a sample value in a current prediction unit, according to an analyzing result of a reference region, according to an embodiment.

FIG. 11 illustrates processes of determining at least one coding unit when a coding unit having a non-square shape is split, according to an embodiment.

FIG. 20 illustrates processes of determining a depth of a coding unit as a shape and size of the coding unit are changed, when a plurality of coding units are determined when the coding unit is recursively split, according to an embodiment.

BEST MODE

Figure 1A:
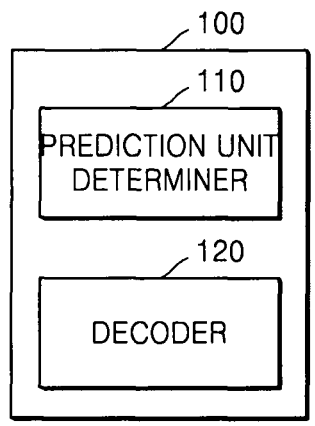
FIG. 1A is a block diagram of an image decoding apparatus performing an image decoding method for considering a characteristic of a reference region, so as to determine a sample value included in a current prediction unit, according to an embodiment.

According to an aspect of the present disclosure, a method of decoding an image, the method includes: determining at least one prediction unit included in a current frame that is one of at least one frame forming the image; determining a reference region to be referred to by a current prediction unit that is one of the at least one prediction unit; changing a sample value included in at least one of the current prediction unit and the reference region, based on an analyzing result of a sample value of the reference region; determining a sample value included in the current prediction unit, based on a result of changing the sample value; and decoding the image based on the determined sample value of the current prediction unit.

The changing of the sample value included in at least one of the current prediction unit and the reference region may include: determining a level to which the reference region belongs to be one of pre-determined N levels, based on a sample value of the reference region; and changing the sample value included in at least one of the current prediction unit and the reference region, based on the determined level.

The changing of the sample value included in at least one of the current prediction unit and the reference region, based on the determined level may include changing the sample value by using different methods for the N levels.

The determining of the level to which the reference region belongs to be one of pre-determined N levels may include determining the level to which the reference region belongs, by comparing the analyzing result of the sample value of the reference region with at least one threshold value.

The changing of the sample value included in at least one of the current prediction unit and the reference region, based on the determined level may include changing the sample value of the reference region by performing, from among pre-determined filtering, filtering related to the determined level on the sample value of the reference region.

The changing of the sample value of the reference region by performing filtering may include changing the sample value of the reference region by performing, on the sample value of the reference region, one of 5-tap filtering, 3-tap filtering, median filtering, and mean filtering, based on the determined level.

The changing of the sample value included in at least one of the current prediction unit and the reference region, based on the determined level may include: determining the level to which the reference region belongs, based on complexity according to distribution of sample values of the reference region; and changing the sample value of the reference region by performing the filtering related to the determined level, wherein the filtering related to the determined level may be stronger when the complexity is higher.

The changing of the sample value included in at least one of the current prediction unit and the reference region, based on the determined level may include: performing intra prediction in the current prediction unit; and changing a prediction sample value of the current prediction unit by performing, from among pre-determined filtering, filtering related to the determined level on the prediction sample value, based on the determined level, wherein the prediction sample value is a result of performing the intra prediction.

The changing of the prediction sample value of the current prediction unit may include changing the prediction sample value of the current prediction unit by performing partial difference equation (PDE)-based filtering on the prediction sample value, based on the determined level, wherein the prediction sample value may be the result of performing the intra prediction.

The changing of the prediction sample value of the current prediction unit may include changing the prediction sample value of the current prediction unit by performing filtering based on a distance between the current prediction unit and the reference region, based on the determined level.

The changing of the sample value included in at least one of the current prediction unit and the reference region, based on the determined level may include changing the prediction sample value of the current prediction unit by adding pseudo-random noise to the prediction sample value according to a noise amount in the current prediction unit, wherein the prediction sample value may be the result of performing the intra prediction.

The changing of the sample value included in at least one of the current prediction unit and the reference region may include changing the sample value, only when prediction is performed according to a pre-determined intra prediction mode in the current prediction unit.

The determining of the reference region may include: obtaining, from a bitstream, information indicating whether the image is to be decoded by using the sample value included in at least one of the current prediction unit and the reference region and changed according to the analyzing result of the sample value of the reference region; and determining the reference region only when the information indicates that the image is to be decoded by using the sample value included in at least one of the current prediction unit and the reference region and changed according to the analyzing result of the sample value of the reference region.

According to another aspect of the present disclosure, an apparatus for decoding an image, the apparatus includes: a prediction unit determiner configured to determine at least one prediction unit included in a current frame that is one of at least one frame forming the image; and a decoder configured to determine a reference region to be referred to by a current prediction unit that is one of the at least one prediction unit, change a sample value included in at least one of the current prediction unit and the reference region, based on an analyzing result of a sample value of the reference region, determine a sample value included in the current prediction unit, based on a result changing the sample value, and decode the image based on the determined sample value of the current prediction unit.

According to another aspect of the present disclosure, a computer-readable recording medium has recorded thereon a computer program performing the method.

Mode of Disclosure

Advantages and features of the present disclosure and methods of accomplishing the same may be understood more readily by reference to the following detailed description of the embodiments and the accompanying drawings. In this regard, the present disclosure may have different forms and should not be construed as being limited to the descriptions set forth herein. Rather, embodiments are provided so that this disclosure of the present specification will be thorough and complete and will fully convey the concept of the present disclosure to one of ordinary skill in the art.

Hereinafter, the terms used in the specification will be briefly defined, and the present disclosure will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the disclosure.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the specification means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a static image such as a still image or a dynamic image such as a moving image, i.e., a video itself.

Hereinafter, a "sample" is data allocated to a sampling location of an image and may mean data that is a processing target. For example, pixel values in an image of a spatial domain or transformation coefficients on a transformation domain may be samples. A unit including at least one sample may be defined as a block.

Reference will now be made in detail to embodiments of the present disclosure, examples of which are illustrated in the accompanying drawings. In the following description, well-known functions or constructions are not described in detail so as not to obscure the present disclosure with unnecessary detail.

FIG. 1A is a block diagram of an image decoding apparatus performing an image decoding method for considering a characteristic of a reference region, so as to determine a sample value included in a current prediction unit, according to an embodiment.

Referring to FIG. 1A, an image decoding apparatus 100 may include a prediction unit determiner 110 for determining a prediction unit that is one of various data units included in a current frame, and a decoder 120 decoding an image based on the determined prediction unit. According to an embodiment, operations performed by the prediction unit determiner 110 and operations performed by the decoder 120 may be performed by distinguished software components, or by one piece of hardware (for example, a processor). Details about operations of the image decoding apparatus 100 are described through various embodiments hereinbelow.

FIG. 2 is a flowchart of processes by which the image decoding apparatus 100 determines a sample value included in a current prediction unit, based on an analyzing result of a reference region, and decodes an image, according to an embodiment.

In operation S200, the prediction unit determiner 110 of the image decoding apparatus 100 may determine at least one prediction unit included in a current frame that is one of at least one frame forming an image, according to an embodiment.

According to an embodiment, the decoder 120 may determine at least one coding unit included in the current frame prior to a process of determining the at least one prediction unit, and the prediction unit determiner 110 may determine the at least one prediction unit included in each coding unit. In other words, the prediction unit determiner 110 may determine the at least one prediction unit included in a current coding unit that is one of the at least one coding unit.

According to another embodiment, the decoder 120 may determine the at least one coding unit included in the current frame and determine that prediction is performed based on the determined coding unit. According to an embodiment, when the at least one coding unit not only has a square shape, but may also have a non-square shape, the image decoding apparatus 100 may use the at least one coding unit as a data unit used while performing prediction. Thus, according to various embodiments, a coding unit and a prediction unit may have the same size or the prediction unit may be included in the coding unit, and thus hereinafter, a data unit used during prediction will be referred to as a prediction unit for convenience of description. Also, processes of determining a coding unit according to an embodiment will be described later through various embodiments show in FIG. 10.

According to an embodiment, the prediction unit determiner 110 may obtain, from a bitstream, various types of information so as to determine a prediction unit. For example, the image decoding apparatus 100 may obtain, from a received bitstream, information indicating whether prediction is performed based on a data unit having a same size as a current coding unit, information indicating a shape of at least one prediction unit included in the current coding unit, etc., and use the information to determine at least one prediction unit.

In operation S202, the image decoding apparatus 100 may determine a reference region to be referred to by a current prediction unit that is one of the at least one prediction unit, according to an embodiment. According to an embodiment, a reference region may be defined as a pre-determined data unit that may be referred to by a current prediction unit so as to determine a sample value included in the current prediction unit.

Figure 3A:
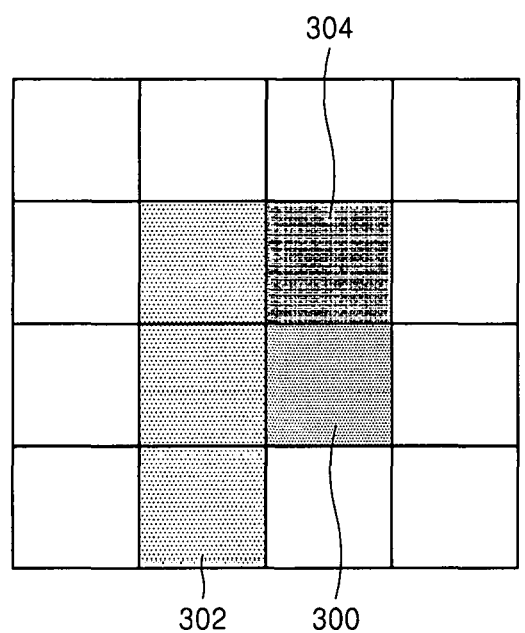
FIG. 3A illustrates a spatial relationship between a current prediction unit and a reference region.

FIG. 3A illustrates a spatial relationship between the current prediction unit and the reference region.

According to an embodiment, the decoder 120 of the image decoding apparatus 100 may determine a reference region adjacent to a current prediction unit, so as to determine a sample value of samples included in the current prediction unit. Referring to FIG. 3A, the decoder 120 may determine a reference region 304 adjacent to an upper boundary of a current prediction unit 300 as a reference region to which the current prediction unit 300 refers.

According to an embodiment, a shape of the reference region may indicate a shape of various data units. According to an embodiment, the reference region may have a same sire as the current prediction unit or may correspond to a total size of an integer number of the current prediction units. Referring to FIG. 3A, the decoder 120 may determine the reference region 304 that is adjacent to the upper boundary of the current prediction unit 300 and has a same shape as the current prediction unit 300.

As another example, referring to FIG. 3A, the decoder 120 may determine a reference region 302 that is adjacent to a left boundary of the current prediction unit 300 and has a shape of a region corresponding to three times the size of the current prediction unit 300.

Figure 3B:
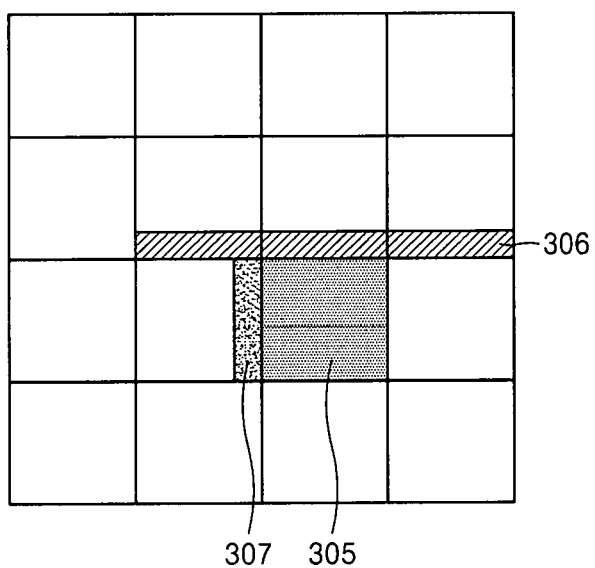
FIG. 3B illustrates another example of a spatial relationship between a current prediction unit and a reference region.

FIG. 3B illustrates another example of a spatial relationship between a current prediction unit and a reference region.

Referring to FIG. 3B, the decoder 120 may determine a reference region adjacent to an upper boundary of a current prediction unit 305 as a reference region to which the current prediction unit 300 refers.

According to an embodiment, a shape of a reference region may indicate a shape of various data units. According to an embodiment, a reference region may not have a shape having an integer multiple size of a current prediction unit. Referring to FIG. 3B, the decoder 120 may determine, as a reference region, at least one sample row 306 adjacent to the upper boundary of the current prediction unit 300. According to an embodiment, a horizontal size of the sample row 306 may be an integer multiple of a horizontal size of the current prediction unit 305.

As another example, referring to FIG. 3B, the decoder 120 may determine, as a reference region, at least one sample column 307 adjacent to a left boundary of the current prediction unit 305. According to an embodiment, a vertical size of the sample column 307 may be the same as a vertical size of the current prediction unit 305.

According to an embodiment, the decoder 120 may determine, as a reference region, a region including reference samples referred to during intra prediction of a current prediction unit.

Here, a shape of a reference region referred to by a current prediction unit may be related to at least one of a horizontal size and a vertical size of the current prediction unit, but should not be limitedly interpreted to above embodiments, and the reference region may be determined to be an arbitrary region at a pre-determined location in a current frame, which may be referred to by the current prediction unit.

According to an embodiment, a reference region related to a current prediction unit may be a pre-determined region that is not adjacent to the current prediction unit. According to an embodiment, a reference region may be determined to be a region adjacent to a boundary of a data unit (for example, a coding unit, a largest coding unit, a slice, a slice segment, or the like) including a current prediction unit.

In operation S204, the image decoding apparatus 100 may change a sample value included in at least one of the current prediction unit and the reference region, based on an analyzing result of a sample value of the reference region, according to an embodiment.

According to an embodiment, the decoder 120 may use various methods to analyze characteristics of sample values included in the reference region. According to an embodiment, the decoder 120 may perform various analyses, such as complexity, correlation, contrast, variance, noise inclusion, gradient, eigenvalue, transform coefficient, directivity, histogram, etc., based on the sample values of the reference region. The decoder 120 may change the sample value included in at least one of the current prediction unit and the reference region that is an analysis target, based on such analyzing result of the reference region.

According to an embodiment, the decoder 120 may refer to sample values of a reference region located at at least one of left and upper directions of a current prediction unit and obtain an analyzing result of the referred sample values. In other words, a shape of the reference region to be analyzed by the image decoding apparatus 100 may vary as described above, and a relative location of the reference region with respect to the current prediction unit may be a location adjacent to at least one of left and upper boundaries of the current prediction unit, but may alternatively be a location not adjacent to a boundary of the current prediction unit (for example, a location adjacent to a boundary of a coding unit, a largest coding unit, a slice, a slice segment, or the like including the current prediction unit).

According to an embodiment, samples included in a reference region may include sample values decoded previously to the decoding of a current prediction unit.

According to an embodiment, various filtering processes may be performed on a boundary of at least one of a current prediction unit and a reference region, so as to change a sample value included in at least one of the current prediction unit and the reference region, based on an analyzing result. Processes of changing each of sample values will be described later through various embodiments.

In operation S206, the decoder 120 may determine the sample value included in the current prediction unit, based on a result of changing the sample value, according to an embodiment. The decoder 120 may determine sample values of the current prediction unit according to a result the changing of operation S204 and use the sample values during decoding later. For example, the decoder 120 may amend a prediction sample value included in the current prediction unit, based on the analyzing result of the reference region, or as another example, the sample value of the reference region may be changed and intra prediction in the current prediction unit may be performed by referring to the changed sample value. Details thereof will be described later through various embodiments.

In operation S208, the decoder 120 may decode an image based on the sample value of the current prediction unit determined in operation S206, according to an embodiment. The decoder 120 may perform image decoding by processing various types of data including the sample value of the current prediction unit while performing image decoding processes. In other words, the sample value of the current prediction unit determined in operation S206 may be used as a prediction sample value during the image decoding processes and used as a result of performing pre-determined filtering processes.

Figure 4A:
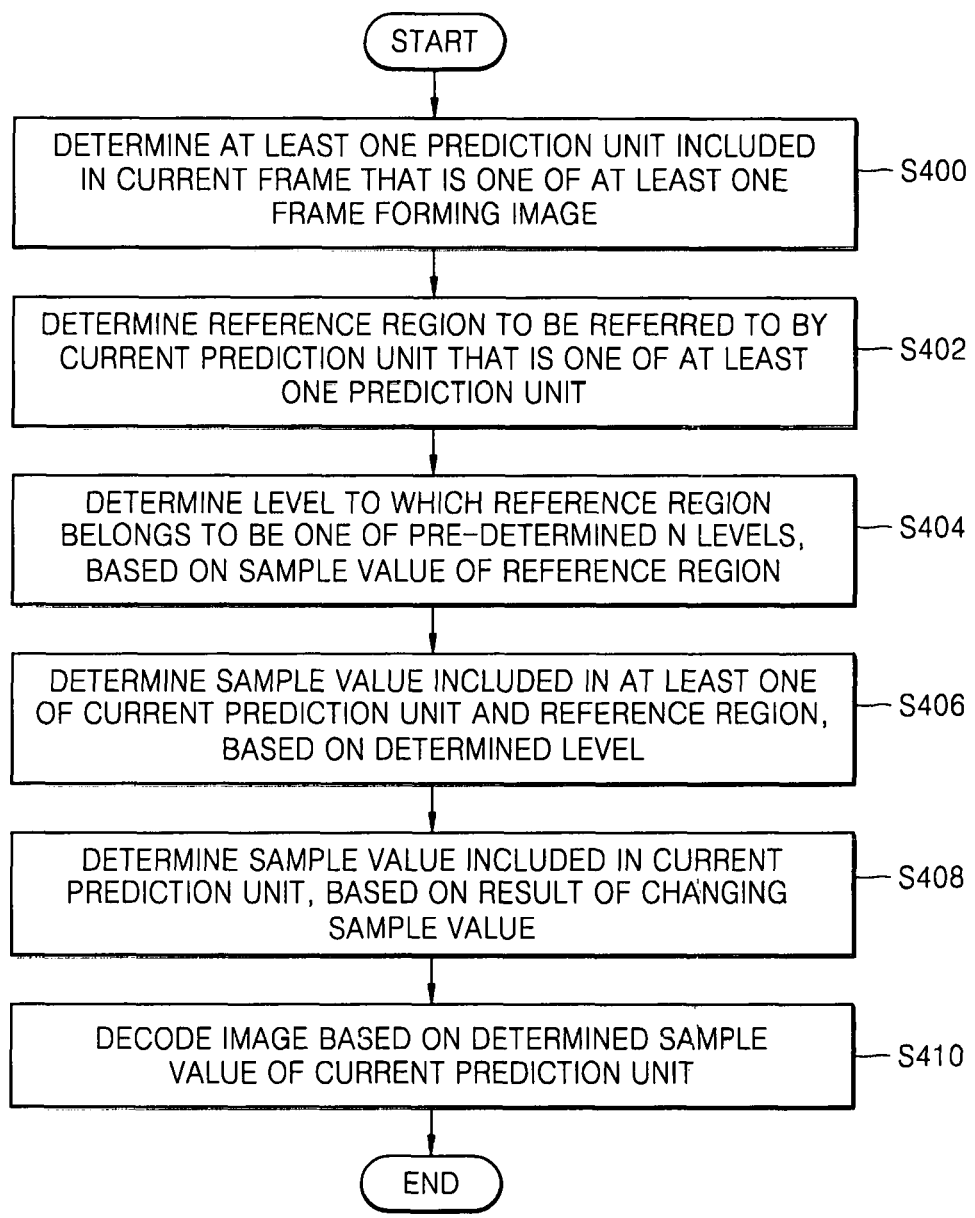
FIG. 4A is a flowchart of processes of determining a reference region to be one of pre-determined N levels, according to an analyzing result of the reference region, according to an embodiment.

FIG. 4A is a flowchart of processes of determining a reference region to be one of pre-determined N levels, according to an analyzing result of the reference region, according to an embodiment.

Since features of operations S400 and S402 respectively include similar features as operations S200 and S202 of FIG. 2, details thereof are not provided again.

In operation S404, the decoder 120 may determine a level, to which the reference region belongs, to be one of pre-determined N levels, based on a sample value of the reference region determined in operation S402, so as to analyze the reference region. According to an embodiment, the decoder 120 may determine a characteristic of the reference region to be referred to by the current prediction unit by determining the level of the reference region to be one of the pre-determined N levels. The pre-determined N levels are classified based on an analyzing result, according to one of the characteristics of the reference region (for example, complexity, correlation, contrast, variance, noise inclusion, gradient, eigenvalue, transform coefficient, directivity, histogram, etc). For example, the decoder 120 may classify the reference region to N levels, based on distribution of the reference region, and determine whether the reference region is a region having high contrast due to a large difference between a maximum value and a minimum value of sample values of the reference region, or a region having large noise, according to a result of analyzing distribution of the sample values.

In operation S406, the decoder 120 may change a sample value included in at least one of the current prediction unit and the reference region, based on the level determined in operation S402, according to an embodiment. The decoder 120 may change the sample value included in at least one of the current prediction unit and the reference region, by using a sample value changing method pre-determined in relation to each level. For example, when the sample value is changed by performing filtering on a boundary of the current prediction unit, the decoder 120 may perform filtering of different intensities per level.

According to an embodiment, when filtering related to the level to which the reference region belongs is performed on a prediction sample value included in the current prediction unit, the decoder 120 may change the prediction sample value that is a result of performing intra prediction included in the current prediction unit to use the changed prediction sample value during reconstruction processes after prediction.

According to another embodiment, when the filtering related to the level to which the reference region belongs is performed on a sample value included in the reference region, the decoder 120 may change the sample value included in the reference region, and then perform decoding processes by using the changed sample value. For example, when the reference region is a region referred to during intra prediction processes of the current prediction unit, the filtering related to the level to which the reference region belongs is performed to change the sample value of the reference region, and then intra prediction based on the changed sample value of the reference region may be performed during intra prediction processes of the current prediction unit.

However, a method of changing the sample value included in at least one of the current prediction unit and the reference region should not be interpreted limitedly to the filtering described above, and various data processing methods usable while processing the sample value may be included.

Since features of operations S408 and S410 may respectively correspond to features similar to those of operations S206 and S208 of FIG. 2, details thereof are not provided again.

Figure 4B:
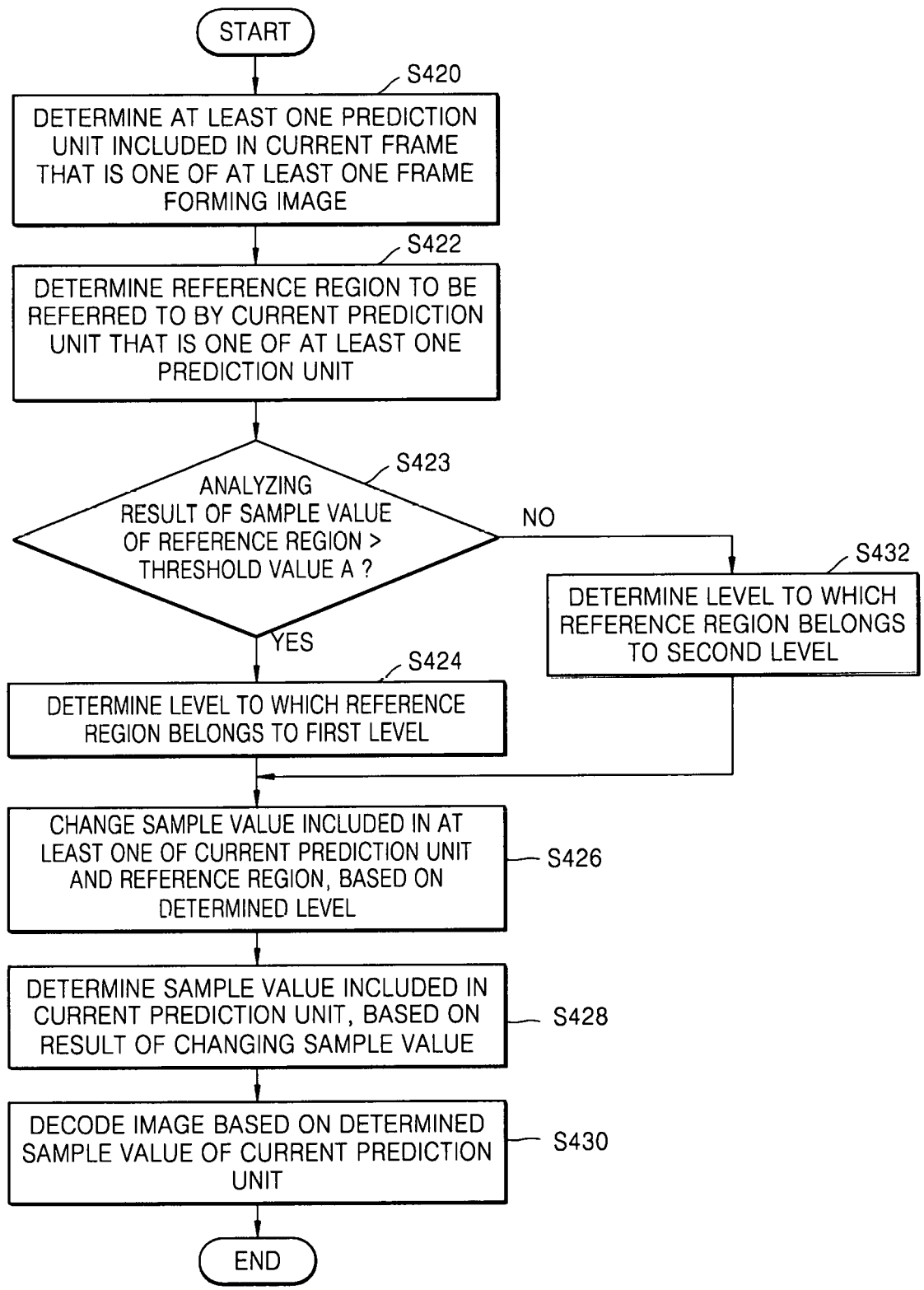
FIG. 4B is a flowchart of processes of determining a reference region to be one of pre-determined N levels, by comparing an analyzing result of the reference region with a threshold value, according to an embodiment.

FIG. 4B is a flowchart of processes of determining a reference region to be one of pre-determined N levels, by comparing an analyzing result of the reference region with a threshold value, according to an embodiment.

Since features of operations S420 and S422 respectively include similar features as operations S400 and S402 of FIG. 4A, details thereof are not provided again.

In operation S423, the decoder 120 may determine one of the pre-determined N levels as the level of the reference region, by comparing the analyzing result of the sample value of the reference region with a pre-determined threshold value A. According to an embodiment, the pre-determined threshold value A may be set differently based on which characteristic of the sample value of the reference region is analyzed by the decoder 120. For example, a threshold value to be compared by calculating complexity of the reference region and a threshold value to be compared by calculating distribution of the reference region may be different. In other words, the decoder 120 may determine and use different threshold values per characteristic of the reference region to be analyzed.

When it is determined that the analyzing result of the sample value of the reference region is higher than the threshold value A in operation S423, the decoder 120 may determine the level to which the reference region belongs to a first level in operation S424.

When it is determined that the analyzing result of the sample value of the reference region is lower than or equal to the threshold value A in operation S423, the decoder 120 may determine the level to which the reference region belongs to a second level in operation S432.

In operation S426, the decoder 120 may change the sample value included in at least one of the current prediction unit and the reference region by using a sample value changing method related to the level of the reference region, which is determined to be the first or second level. Since features of operations S426 through S430 may respectively correspond to features similar to those of operations S406 through S410 of FIG. 4A, details thereof are not provided again.

Figure 4C:
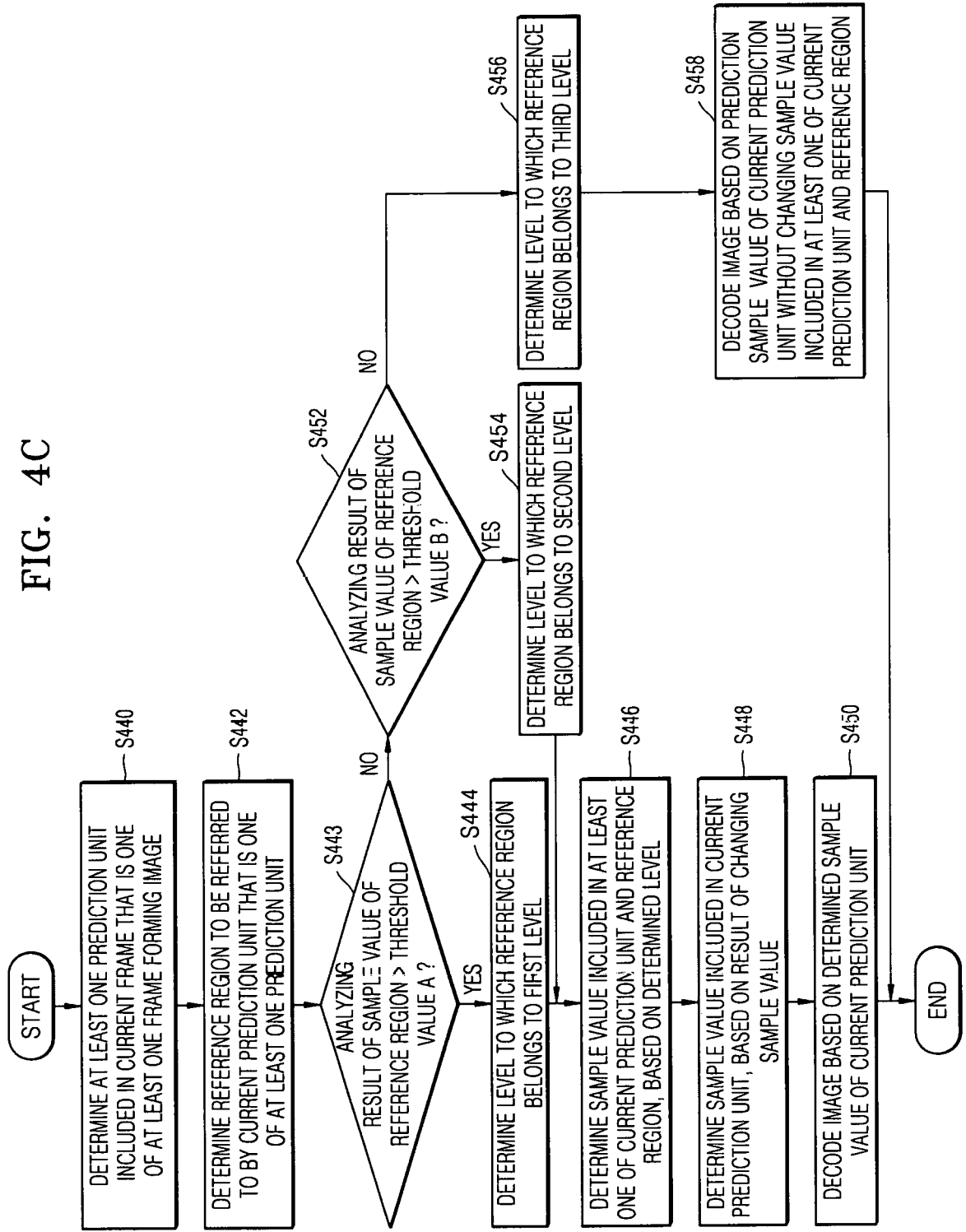
FIG. 4C is a flowchart of processes of determining a reference region to be one of pre-determined N levels by comparing an analyzing result of the reference region with a plurality of threshold values, and determining whether to change a sample value included in at least one of a current prediction unit and the reference region, based on the determined level.

FIG. 4C is a flowchart of processes of determining a reference region to be one of pre-determined N levels, by comparing an analyzing result of the reference region with a plurality of threshold values, and determining whether to change a sample value included in at least one of a current prediction unit and the reference region, based on the determined level.

Since features of operations S440 and S442 respectively include similar features as operations S420 and S422 of FIG. 4B, details thereof are not provided again.

In operation S443, the decoder 120 may determine one of the pre-determined N levels as the level of the reference region, by comparing the analyzing result of the sample value of the reference region with the pre-determined threshold value A, according to an embodiment. When the analyzing result of the sample value of the reference region is higher than the pre-determined threshold value A, the decoder 120 may determine the level to which the reference region belongs to the first level in operation S444.

According to an embodiment, when the analyzing result of the sample value of the reference region is lower than or equal to the pre-determined threshold value A, the decoder 120 may determine one of the pre-determined N levels to be the level of the reference region, by comparing the analyzing result of the sample value of the reference region with a pre-determined threshold value B, according to an embodiment, in operation S452. According to an embodiment, when the analyzing result of the sample value of the reference region is higher than the pre-determined threshold value B, the level to which the reference region belongs may be determined to be the second level.

In operation S446, the decoder 120 may change the sample value included in at least one of the current prediction unit and the reference region, by using a sample value changing method related to the level of the reference region, which is determined to be the first or second level. Since features of operations S446 through S450 may respectively correspond to features similar to those of operations S406 through S410 of FIG. 4A, details thereof are not provided again.

According to an embodiment, the sample value changing method related to the first or second level may vary according to levels. For example, when the decoder 120 changes the sample value by performing filtering on the sample value included in at least one of the current prediction unit and the reference region, the decoder 120 may change the sample value by performing filtering while varying the number of filter-tabs between the first and second levels (for example, 5-tap filter, 3-tap filter, or the like) or by varying a type of filtering (for example, Gaussian filtering, partial difference equation (PDE)-based filtering, median filtering, or the like).

According to an embodiment, when the analyzing result of the sample value of the reference region is lower than or equal to the pre-determined threshold value B, the decoder 120 may determine the level to which the reference region belongs to a third level in operation S456.

In operation S458, based on the determination of the level to which the reference region belongs to the third level according to the analyzing result of the sample value of the reference region, the decoder 120 may perform decoding using samples included in the current prediction unit without changing the sample value included in at least one of the current prediction unit and the reference region as in the first and second levels.

According to an embodiment, when the reference region belongs to the third level, the decoder 120 may perform reconstruction processes after prediction, without changing the prediction sample value that is a result of performing intra prediction included in the current prediction unit. According to another embodiment, when the reference region is in the third level, the decoder 120 may use the reference region during decoding processes without changing the sample value of the reference region. For example, when the reference region, is a region that may be referred to during intra prediction processes of the current prediction unit, the decoder 120 may use the sample value of the reference region during intra prediction processes of the current prediction unit without changing the sample value.

Figure 5A:
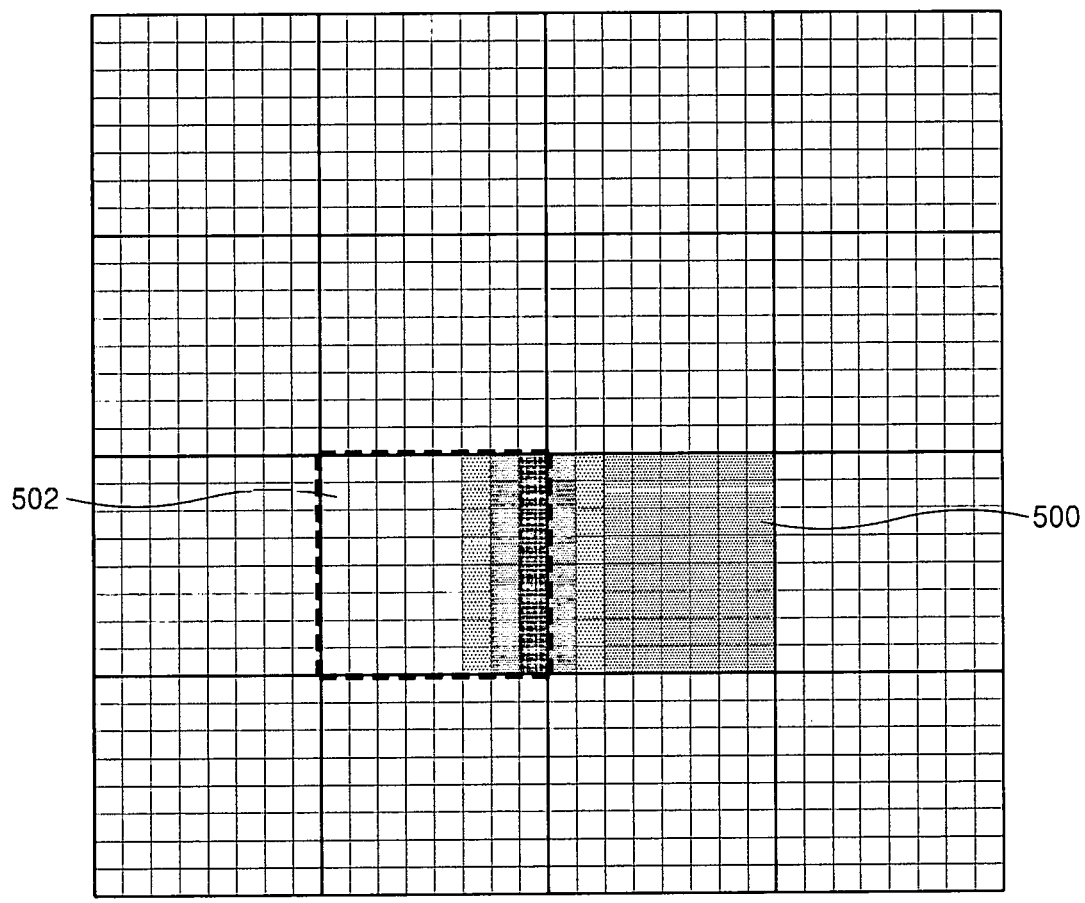
FIG. 5A illustrates a method of changing a sample value of a reference region related to a current prediction unit, according to an analyzing result of the reference region, according to an embodiment.

FIG. 5A illustrates a method of changing a sample value of a reference region related to a current prediction unit, according to an analyzing result of the reference region, according to an embodiment.

According to an embodiment, the prediction unit determiner 110 may determine at least one prediction unit included in a current frame, and the decoder 120 may determine a reference region related to a current prediction unit 500 that is one of the at least one prediction unit. Referring to FIG. 5A, a reference region 502 adjacent to a left boundary of the current prediction unit 500 may include a plurality of samples, and the decoder 120 may perform sample value changing processes (for example, filtering or smoothing of samples adjacent to a boundary) with respect to a level to which a reference region belongs, based on an analyzing result of the reference region 502, according to an embodiment. The reference region 502 is adjacent to the left boundary of the current prediction unit 500, and accordingly, the decoder 120 may perform filtering or smoothing processes of changing sample values included in the reference region 502, based on a distance with the left boundary of the current prediction unit 500. In other words, through the filtering or smoothing processes based on the distance with the boundary of the current prediction unit 500, the effects of the sample values included in the reference region 502 on the current prediction unit 500 during decoding processes may be adjusted.

According to an embodiment, the decoder 120 may apply a 5-tap filter ([3 3 4 3 3]/16, [2 3 6 3 2]/16, or the like), an M-tap Gaussian filter, an M-tap median filter, or the like to a sample value adjacent to the boundary of the reference region 502. According to an embodiment, a location of a sample to which filtering is performed by the decoder 120 may include not only samples adjacent to the boundary of the reference region 502, but also at least one sample row or column from the boundary, and the number of filter-tabs or filtering intensity may vary according to a distance from the boundary.

However, a filtering method that may be performed in a reference region should not be interpreted limitedly to the embodiments above, and various filtering methods that may include relatively more low frequency components in terms of signalling processing of a sample value of a reference region may be performed. According to an embodiment, the decoder 120 may perform the above embodiments of changing a sample value of a reference region only when the reference region related to a current prediction unit is a texture region.

FIG. 5B illustrates processes of performing filtering so as to change a sample value in a current prediction unit, according to an analyzing result of a reference region, according to an embodiment.

Referring to FIG. 5B, a reference region 512 adjacent to an upper boundary of a current prediction unit 510 may include a plurality of samples, and the decoder 120 may perform sample value changing processes (for example, filtering or smoothing of samples adjacent to a boundary) with respect to a level to which a reference region belongs, based on an analyzing result of the reference region 512, according to an embodiment. The reference region 512 is adjacent to the upper boundary of the current prediction unit 510, and accordingly, the decoder 120 may perform filtering or smoothing processes of changing sample values included in the reference region 512, based on a distance with the left boundary of the current prediction unit 510.

According to an embodiment, the decoder 120 may apply a 5-tap filter ([3 3 4 3 3]/16, [2 3 6 3 2]/16, or the like), an M-tap Gaussian filter, an M-tap median filter, or the like to a sample value adjacent to a boundary of the reference region 512. According to an embodiment, a location of a sample to which filtering is performed by the decoder 120 may include not only samples adjacent to the boundary of the reference region 512, but also at least one sample row or column from the boundary, and the number of filter-tabs or filtering intensity may vary according to a distance from the boundary.

Referring to FIG. 5B, the decoder 120 may perform filtering for reducing artifacts generated due to a difference between sample values at a boundary between the reference region 512 and the current prediction unit 510, and according to an embodiment, may perform PDE-based filtering. When the decoder 120 performs PDE-based filtering on the boundary of the current prediction unit 510, a sample value of the current prediction unit 510 is affected more by a sample value of the reference region 512 closer to a boundary of the reference region 512, and thus a sample value difference between the reference region 512 and the current prediction unit 510 may be reduced, and accordingly, objective or subjective image quality may be improved. The decoder 120 may perform filtering of changing a sample value such that samples at locations not adjacent to the reference region 512, from among samples included in the current prediction unit 510, are determined to be the same as existing sample values of the current prediction unit 510, or include relatively more low frequency components compared to the existing sample values in terms of signalling processing.

Referring to FIG. 5B, the decoder 120 may perform PDE-based filtering on sample rows 514a through 514d adjacent to the boundary of the current prediction unit 510 to change sample values (for example, as indicated by reference numerals 518a and 518b) such that differences between sample values (for example, 516a through 516d) respectively of the sample rows 514a through 514d and a sample value (for example, 516e) located at a boundary 514e of the reference region 512 are reduced.

However, since a PDE-based filtering method described above may be embodied in various forms according to sample values included in a reference region and a current prediction unit, the PDE-based filtering method should not be interpreted limitedly to a filtering method described above, and various types of PDE-based filtering methods reducing a difference between a current prediction unit and a reference region may be used.

According to an embodiment, the decoder 120 may perform the above embodiments of changing a sample value of a current prediction unit only when a reference region related to the current prediction unit is a texture region.

According to an embodiment, the decoder 120 may perform decoding by combining two changing processes after changing sample values of the reference region and the current prediction unit, based on the analyzing result of the reference region. In other words, the decoder 120 may change the sample value of the reference region by performing filtering related to the level to which the reference region belongs on samples located at the boundary of the reference region. In addition, the decoder 120 may determine a prediction sample value of the current prediction unit by referring to the changed sample value of the reference region and change the prediction sample value included in the current prediction unit by performing filtering related to the level to which the reference region belongs on the prediction sample value. Since a sample value changing method performed on each of the reference region and the current prediction unit has been described above through various embodiments, details thereof are not provided again.

According to an embodiment, the image decoding apparatus 100 may change sample values included in the current prediction unit by adding certain noise. The decoder 120 may add certain noise (for example, pseudo random noise) to a sample value included in a current prediction unit, thereby reducing banding noise.

Figure 6A:
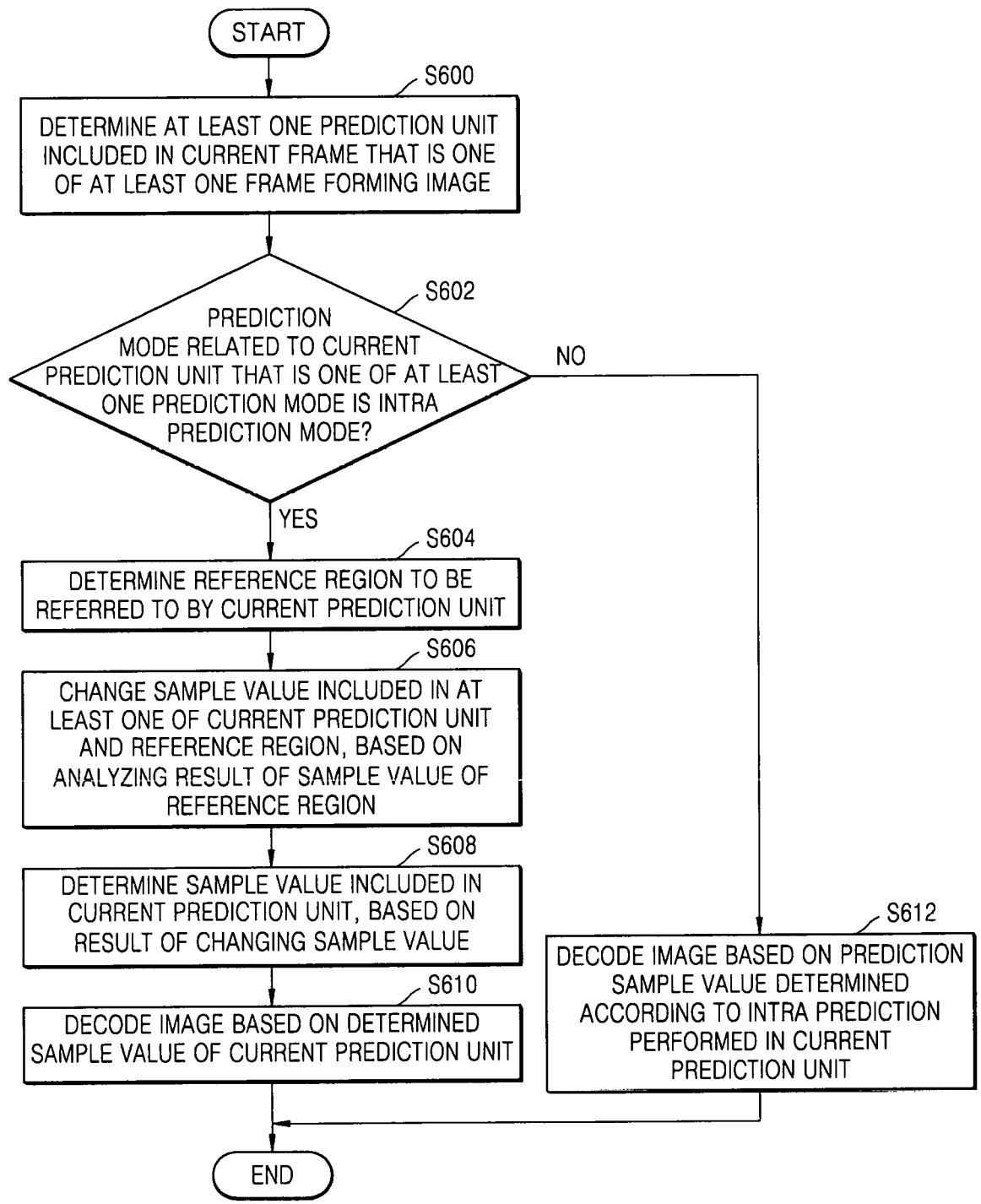
FIG. 6A illustrates a flowchart of processes of determining whether to analyze a reference region, based on a prediction mode performed in a current prediction unit, according to an embodiment.

FIG. 6A illustrates a flowchart of processes of determining whether to analyze a reference region, based on a prediction mode performed in a current prediction unit, according to an embodiment.

In operation S600, the prediction unit determiner 110 of the image decoding apparatus 100 may determine at least one prediction unit included in a current frame that is one of at least one frame forming an image, according to an embodiment. Since features of operation S600 may be similar features as those of operation S200 of FIG. 2, details thereof are not provided again.

In operation S602, the decoder 120 of the image decoding apparatus 100 may determine whether a prediction mode related to a current prediction unit that is one of the at least one prediction unit is an intra prediction mode. According to an embodiment, the decoder 120 may determine whether the prediction mode of the current prediction unit is an intra prediction mode, based on syntax indicating the prediction mode of the current prediction unit, the syntax being obtained from a bitstream, per pre-determined data unit (for example, the current prediction unit, a coding unit including the current prediction unit, or the like).

According to an embodiment, when the prediction mode of the current prediction unit is an intra prediction mode, the decoder 120 may determine a reference region to be referred to by the current prediction unit in operation S604. Since features of operations S604 through S610 may be respectively similar features as those of operations S202 through 208 of FIG. 2, details thereof are not provided again.

According to an embodiment, when the prediction mode of the current prediction unit is an intra prediction mode, the decoder 120 may perform image reconstruction processes after prediction by using a prediction sample value determined according to a result of performing intra prediction of the current prediction unit, without changing the sample value included in at least one of the current prediction unit and the reference region, in operation S612. In other words, with respect to performing, by the image decoding apparatus 100, of various embodiments for decoding an image by changing the sample value according to the analyzing result of the reference region, the decoder 120 may perform decoding processes through the various embodiments described above only when the prediction mode of the current prediction unit is an intra prediction mode.

Figure 6B:
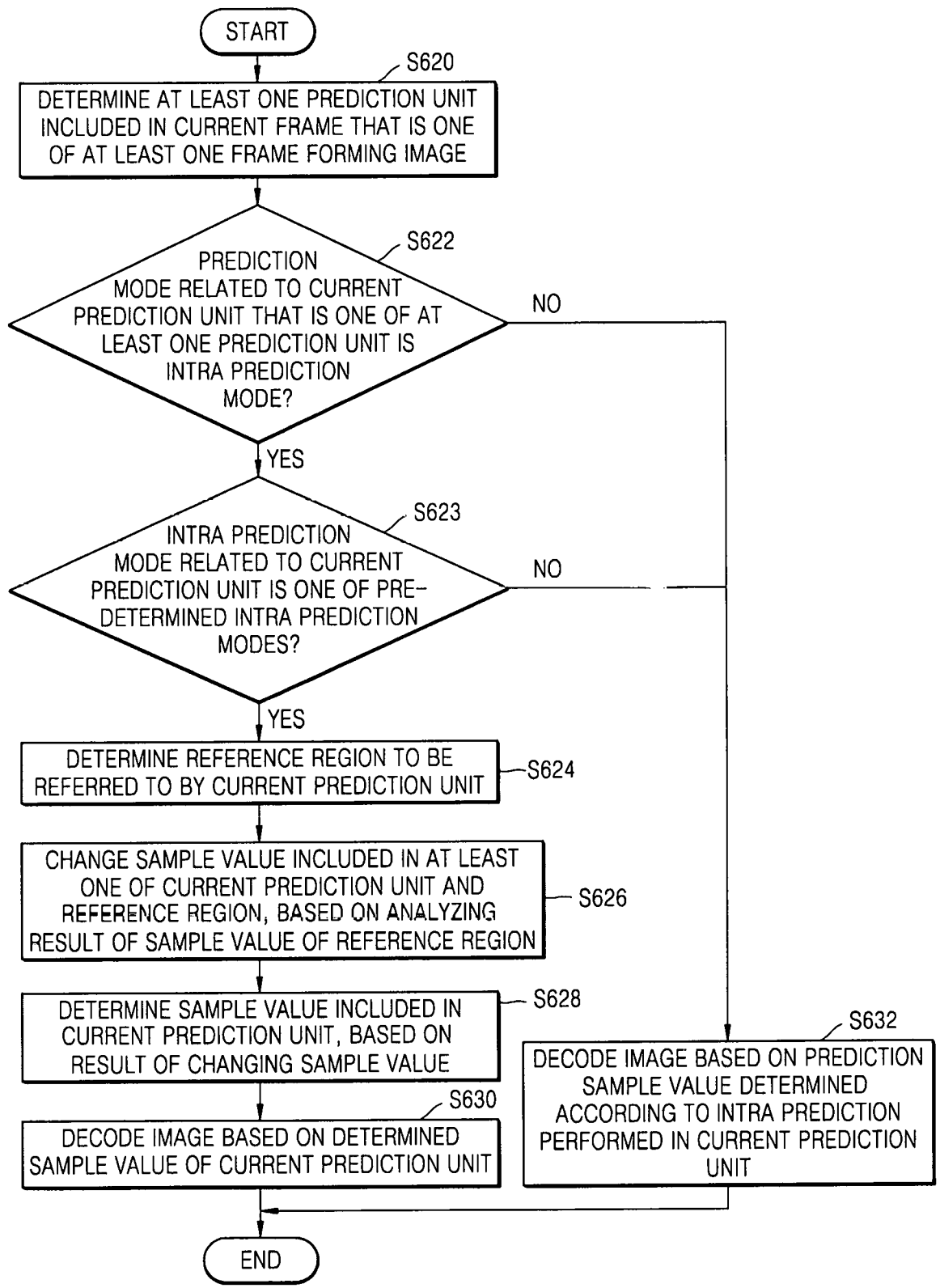
FIG. 6B illustrates a flowchart of processes of determining whether to analyze a reference region, based on whether a prediction mode of a current prediction unit is one of pre-determined intra prediction modes, according to an embodiment.

FIG. 6B illustrates a flowchart of processes of determining whether to analyze a reference region, based on whether a prediction mode of a current prediction unit is one of pre-determined intra prediction modes, according to an embodiment.

In operation S620, the prediction unit determiner 110 of the image decoding apparatus 100 may determine at least one prediction unit included in a current frame that is one of at least one frame forming an image, according to an embodiment. Since features of operation S620 may be similar features as those of operation S200 of FIG. 2, details thereof are not provided again.

In operation S622, the decoder 120 of the image decoding apparatus 100 may determine whether a prediction mode related to a current prediction unit that is one of the at least one prediction unit is an intra prediction mode. According to an embodiment, the decoder 120 may determine whether the prediction mode of the current prediction unit is an intra prediction mode, based on syntax indicating the prediction mode of the current prediction unit, the syntax being obtained from a bitstream, per pre-determined data unit (for example, the current prediction unit, a coding unit including the current prediction unit, or the like). Since features of operation S622 may be similar features as those of operation S602 of FIG. 6A, details thereof are not provided again.

According to an embodiment, when the prediction mode of the current prediction unit is an intra prediction mode, the decoder 120 may determine whether the intra prediction mode of the current prediction unit is one of pre-determined intra prediction modes, in operation S623. According to an embodiment, the pre-determined intra prediction modes may include at least one of a plurality of intra prediction modes that may be used during image decoding processes. According to an embodiment, the pre-determined intra prediction modes may include at least one of intra prediction modes (for example, a DC mode, a vertical mode, and a horizontal mode) relatively mostly used from among various intra prediction modes used during compressing processes of a current image. Hereinafter, it is described that the pre-determined prediction mode is a DC mode, for convenience of description.

According to an embodiment, when the intra prediction mode of the current prediction unit is a DC mode, the decoder 120 may determine a reference region to be referred to by the current prediction unit, in operation S624. Since features of operations S624 through S630 may be similar features as those of operations S202 through S208 of FIG. 2, details thereof are not provided again.

According to an embodiment, when the decoder 120 determines that the prediction mode related to the current prediction unit is not an intra prediction mode in operation S622, or when the decoder 120 determines that the intra prediction mode related to the current prediction mode is not a DC mode in operation S623, the decoder 120 may perform image reconstruction processes after prediction by using a prediction sample value determined according to a result of performing intra prediction of the current prediction unit, without changing the sample value included in at least one of the current prediction unit and the reference region, in operation S632. In other words, with respect to performing, by the image decoding apparatus 100, of various embodiments for decoding an image by changing the sample value according to the analyzing result of the reference region, the decoder 120 may perform decoding processes through the various embodiments described above only when the prediction mode of the current prediction unit is a DC mode, i.e., a pre-determined intra prediction mode.

According to an embodiment, even when the prediction mode of the current prediction unit is a pre-determined intra prediction mode, the decoder 120 may change the sample values included in at least one of the current prediction unit and the reference region, while considering the level to which the reference region belongs. Accordingly, one of ordinary skill in the art may combine the various embodiments within obvious ranges.

According to an embodiment, the decoder 120 of the image decoding apparatus 100 may obtain, from a bitstream, certain information or a flag indicating whether image decoding processes are performed, the image decoding processes using the sample value included in at least one of the current prediction unit and the reference region, the sample value being changed based on the analyzing result of the reference region. The decoder 120 may determine to perform the various embodiments described above only when the information of the flag obtained according to an embodiment indicates that an image is decoded by using the sample value included in at least one of the current prediction unit and the reference region, the sample value being changed based on the analyzing result of the reference region. In other words, the following image decoding processes including processes of determining a reference region (for example, operations S202, S402, S422, S442, S604, or S624) may be performed only when the obtained information or flag indicates that an image is decoded by using the sample value included in at least one of the current prediction unit and the reference region, the sample value being changed based on the analyzing result of the reference region.

Figure 1B:
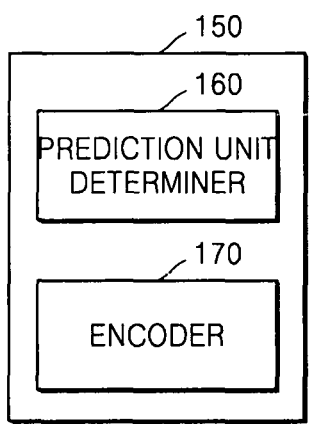
FIG. 1B is a block diagram of an image encoding apparatus performing an image encoding method for considering a characteristic of a reference region, so as to determine a sample value included in a current prediction unit, according to an embodiment.

FIG. 1B is a block diagram of an image encoding apparatus performing an image encoding method for considering a characteristic of a reference region, so as to determine a sample value included in a current prediction unit, according to an embodiment.

Referring to FIG. 1B, an image encoding apparatus 150 may include a prediction unit determiner 160 for determining a prediction unit that is one of various data units included in a current frame, and an encoder 170 encoding an image based on the determined prediction unit. According to an embodiment, operations performed by the prediction unit determiner 160 and operations performed by the encoder 170 may be performed by distinguished software components, or by one piece of hardware (for example, a processor). Details about operations of the image encoding apparatus 150 are described through various embodiments hereinbelow.

The image encoding method performed by the image encoding apparatus 150 may be similar to or reverse of the image decoding method of the image decoding apparatus 100 described with reference to FIG. 2.

FIGS. 3A and 3B illustrate a spatial relationship between a current prediction unit and a reference region. Since the relationship between the current prediction unit and the reference region, which may be used by the image encoding apparatus 150 while performing the image encoding method, may correspond to a similar relationship as that between the current prediction unit and the reference region, which may be used by the image decoding apparatus 100, described with reference to FIGS. 3A and 3B above, details thereof are not provided again.

In relation to FIGS. 4A through 4C, since features of the image encoding apparatus 150 determining a reference region to be one of pre-determined N levels according to an analyzing result of the reference region, and further determining a level to which the reference region belongs by using at least one pre-determined threshold value may be similar to features of or correspond to features including reverse processes of the image decoding apparatus 100 described above with reference to FIGS. 4A through 4C, details thereof are not provided again.

Since various embodiments (for example, various methods of filtering, smoothing, etc.) usable by the image encoding apparatus 150 to change a sample value included in at least one of a reference region and a current prediction unit, according to an embodiment, may be methods similar to or reverse of the sample value changing method performable by the image decoding apparatus 100 described above with reference to FIGS. 5A and 5B, details thereof are not provided again.

According to an embodiment, since features of the image encoding apparatus 150 determining whether to perform the various embodiments described above considering whether a prediction mode of a current prediction unit is an intra prediction mode or a pre-determined intra prediction mode may be similar to features of or correspond to features including reverse processes of the image decoding apparatus 100 described above with reference to FIGS. 6A and 6B, details thereof are not provided again.

According to an embodiment, even when a prediction mode of a current prediction unit is a pre-determined intra prediction mode, the encoder 170 may change sample values included in at least one of the current prediction unit and a reference region considering a level to which the reference region belongs. Accordingly, one of ordinary skill in the art may combine the various embodiments described above within the obvious range.

According to an embodiment, the encoder 170 of the image encoding apparatus 150 may generate a bitstream including certain information or a flag indicating whether image encoding processes are performed, the image encoding processes using a sample value included in at least one of a current prediction unit and a reference region, the sample value being changed based on an analyzing result of the reference region. The encoder 170 may determine that the various embodiments described above are performed only when the information or flag obtained according to an embodiment indicates that an image is encoded by using the sample value included in at least one of the current prediction unit and the reference region, the sample value being changed based on the analyzing result of the reference region. In other words, the following image encoding processes including processes of determining the reference region may be performed only when the image is encoded by using the sample value included in at least one of the current prediction unit and the reference region, the sample value being changed based on the analyzing result of the reference region.

Figure 7A:
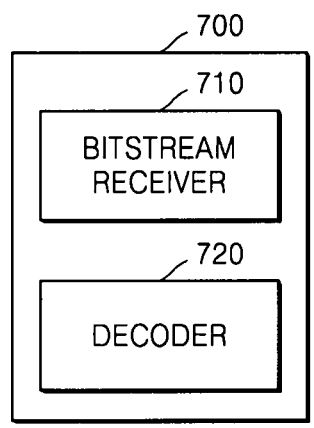
FIG. 7A is a block diagram of an image decoding apparatus for decoding an image by using first information indicating that intra prediction is performed by using pre-determined at least one prediction mode, according to an embodiment.

FIG. 7A is a block diagram of an image decoding apparatus for decoding an image by using first information indicating that intra prediction is performed by using pre-determined at least one prediction mode, according to an embodiment.

According to an embodiment, an image decoding apparatus 700 may include a bitstream receiver 710 and a decoder 720, wherein the bitstream receiver 710 receives a bitstream including first information indicating that intra prediction is performed by using pre-determined at least one prediction mode and second information indicating whether intra prediction is to be performed by referring to an intra prediction mode performed in a block adjacent to a current prediction mode, and the decoder 720 decodes an image based on the first information and the second information obtained from the bitstream. A method of the decoder 720 performing decoding by using the first information and the second information will be described later through various embodiments.

According to an embodiment, the image decoding apparatus 700 may obtain, from the bitstream, at least one of the first information and the second information per certain data unit. The first information and the second information are information related to a prediction mode, and the decoder 720 may obtain at least one of the first information and the second information from the bitstream, per current prediction unit. According to another embodiment, the decoder 720 may obtain, from the bitstream, at least one of the first information and the second information per certain data unit including the current prediction unit (for example, a coding unit, a largest coding unit, a slice, or the like including the current prediction unit). The decoder 120 may perform decoding through prediction processes in the current prediction unit, based on at least one of the obtained first information and second information.

Figure 8:
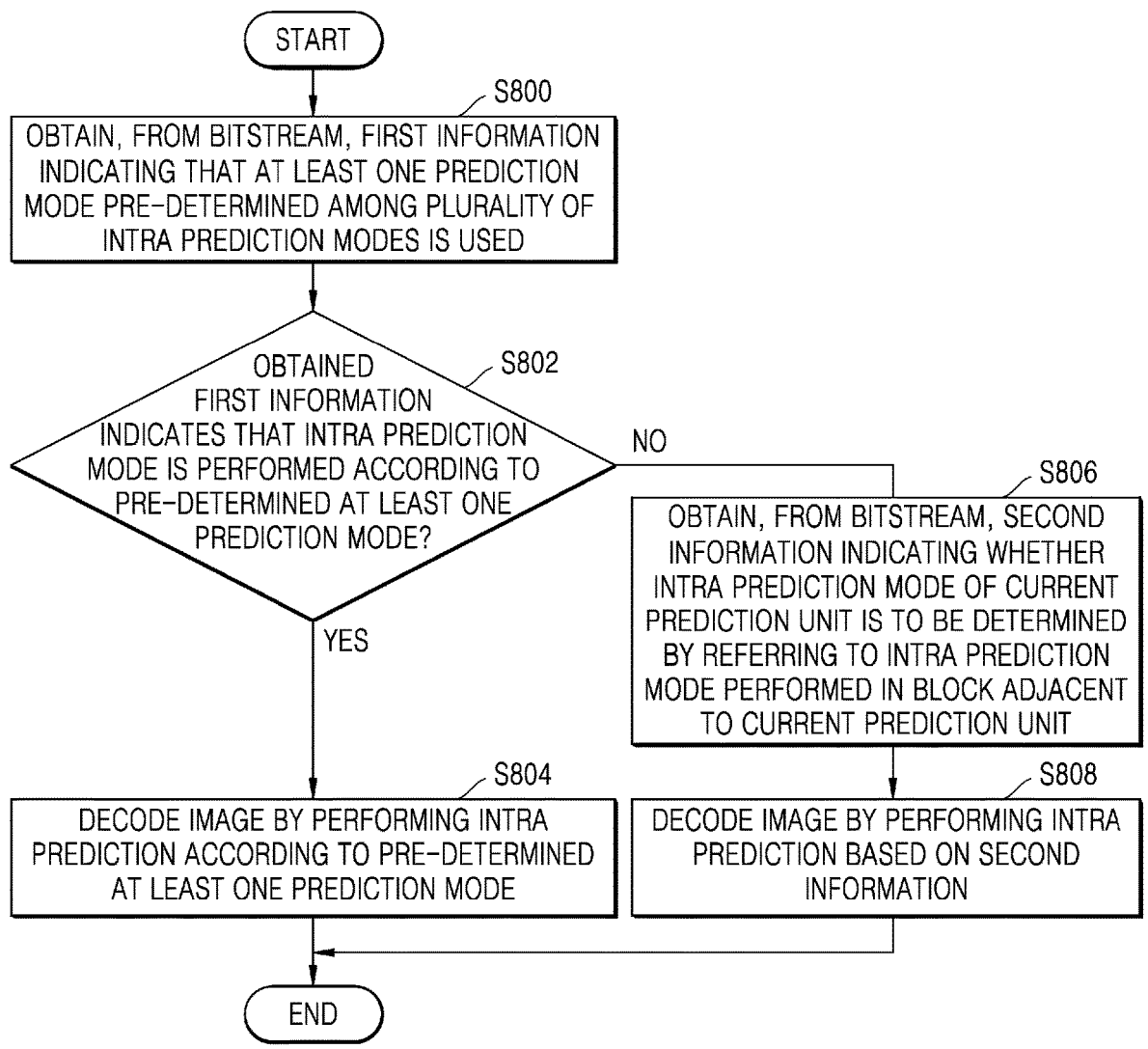
FIG. 8 is a flowchart of an image decoding apparatus decoding an image by obtaining first information and second information from a bitstream, according to an embodiment.

FIG. 8 is a flowchart of an image decoding apparatus decoding an image by obtaining first information and second information from a bitstream, according to an embodiment.

In operation S800, the decoder 720 of the image decoding apparatus 700 may obtain, from the bitstream received by the bitstream receiver 710, the first information indicating that at least one prediction mode pre-determined among a plurality of intra prediction modes is used, according to an embodiment.

In operation S802, the decoder 720 may determine whether the first information obtained in operation S800 indicates that an intra prediction mode is performed according to the pre-determined at least one prediction mode.

According to an embodiment, the decoder 720 may perform prediction by using one of the pre-determined at least one prediction mode, in a current prediction unit. According to an embodiment, the pre-determined at least one prediction mode may include at least one of intra prediction modes (for example, a DC mode, a vertical mode, and a horizontal mode) relatively mostly used from among various intra prediction modes used during compressing processes of a current image.

According to an embodiment, the first information obtained from the bitstream may have different bit numbers according to the number of pre-determined at least one prediction mode. For example, when the pre-determined at least one prediction mode includes a DC mode and a planar mode, the first information may be expressed in one bit. As another example, when the pre-determined at least one prediction mode includes a DC mode, a planar mode, a vertical mode, and a horizontal mode, the first information may be expressed in two bits.

According to an embodiment, when the obtained first information indicates that the intra prediction mode is performed according to the pre-determined at least one prediction mode in operation S802, the decoder 720 may decode an image by performing intra prediction according to the pre-determined at least one prediction mode indicated by the first information, in operation S804.

According to an embodiment, the decoder 702 may determine, based on the first information, whether the intra prediction mode is to be performed according to the pre-determined at least one prediction mode, and furthermore, perform prediction based on the intra prediction mode indicated by the first information. Table 1 below shows whether the decoder 120 is to perform the intra prediction mode according to the at least one prediction mode based on the first information, and the intra prediction mode performed in the current prediction unit, according to an embodiment.

TABLE 1

| First information | Whether intra prediction mode is to be performed according to at least one prediction mode | Intra prediction mode to be performed |
|---|---|---|
| 0b | X | — |
| 1b | ○ | DC mode |
| 00b | X | — |
| 01b | ○ | DC mode |
| 10b | ○ | Planar mode |
| 11b | ○ | Vertical mode |

However, features of the first information shown in Table 1 are an embodiment for describing features that the decoder 720 may determine whether the intra prediction mode is to be performed according to the at least one prediction mode by using the first information and determine the intra prediction mode to be performed in the current prediction unit, and thus the features of the first information are not limited to Table 1.

According to an embodiment, the bit number of first information may correspond to a bit number of a fixed length of a pre-determined N-bit (n-bit fixed length coding), and according to another embodiment, the first information may have a variable bit number when decoding processes using the first information is defined to be performed hierarchically (for example, variable length coding according to an occurrence frequency).

An image decoding method performable by the decoder 720 in operation S804 may include various methods of prediction, inverse transformation, deblocking filtering method, etc, which are performable by using the intra prediction mode determined based on the first information, and may be easily combined with other conventional technologies by one of ordinary skill in the art.

When the obtained first information does not indicate that the intra prediction mode is performed according to the pre-determined at least one prediction mode in operation S802, the decoder 720 may obtain, from the bitstream, second information indicating whether the intra prediction mode of the current prediction unit is to be determined by referring to an intra prediction mode performed in a block adjacent to the current prediction unit, in operation S806. According to an embodiment, when the first information does not indicate that the intra prediction mode is performed according to the at least one prediction mode, the decoder 120 may determine a prediction mode of the current prediction unit by using a most probable mode (MPM). When it is determined that MPM is used based on the second information, the image decoding apparatus 700 may obtain, from the bitstream, an index (for example, mpm_idx) indicating one of a plurality of MPMs. The decoder 120 may perform intra prediction in the current prediction unit, according to the intra prediction mode that may be determined based on the index indicating one of the MPMs.

In operation S808, the decoder 720 may decode an image based on the second information indicating whether the intra prediction is to be performed by referring to the intra prediction mode performed in the block adjacent to the current prediction unit (for example, a block adjacent to the left or top of the current prediction unit), according to an embodiment. According to an embodiment, when the second information indicates that the intra prediction is performed by referring to the intra prediction mode performed in the block adjacent to the current prediction unit (for example, the block adjacent to the left or top of the current prediction unit), the decoder 720 may determine the intra prediction mode of the current prediction unit, based on the intra prediction mode of the block adjacent to the current prediction unit, according to MPM. The decoder 720 may decode the image by performing prediction based on the determined intra prediction mode.

According to an embodiment, when the second information does not indicate that the intra prediction is to be performed by referring to the intra prediction mode performed in the block adjacent to the current prediction unit (for example, the block adjacent to the left or top of the current prediction unit), the decoder 720 may determine the prediction mode of the current prediction unit, based on the intra prediction mode indicating certain information (for example, rem_intra_luma_pred_mode) obtained from the bitstream, without using MPM. According to an embodiment, the decoder 720 may determine the intra prediction mode of the current prediction unit by using an intra prediction mode directly indicated by the certain information, and in this case, the intra prediction mode of the block adjacent to the current prediction unit may not be referred to.

However, the various embodiments of the image decoding apparatus 700 decoding an image according to MPM described above should not be interpreted limitedly to the above embodiments but should be interpreted that features of various MPMs may be combined and used within the range obvious to one of ordinary skill in the art. Details about features of conventional MPMs will not be provided.

Figure 9:
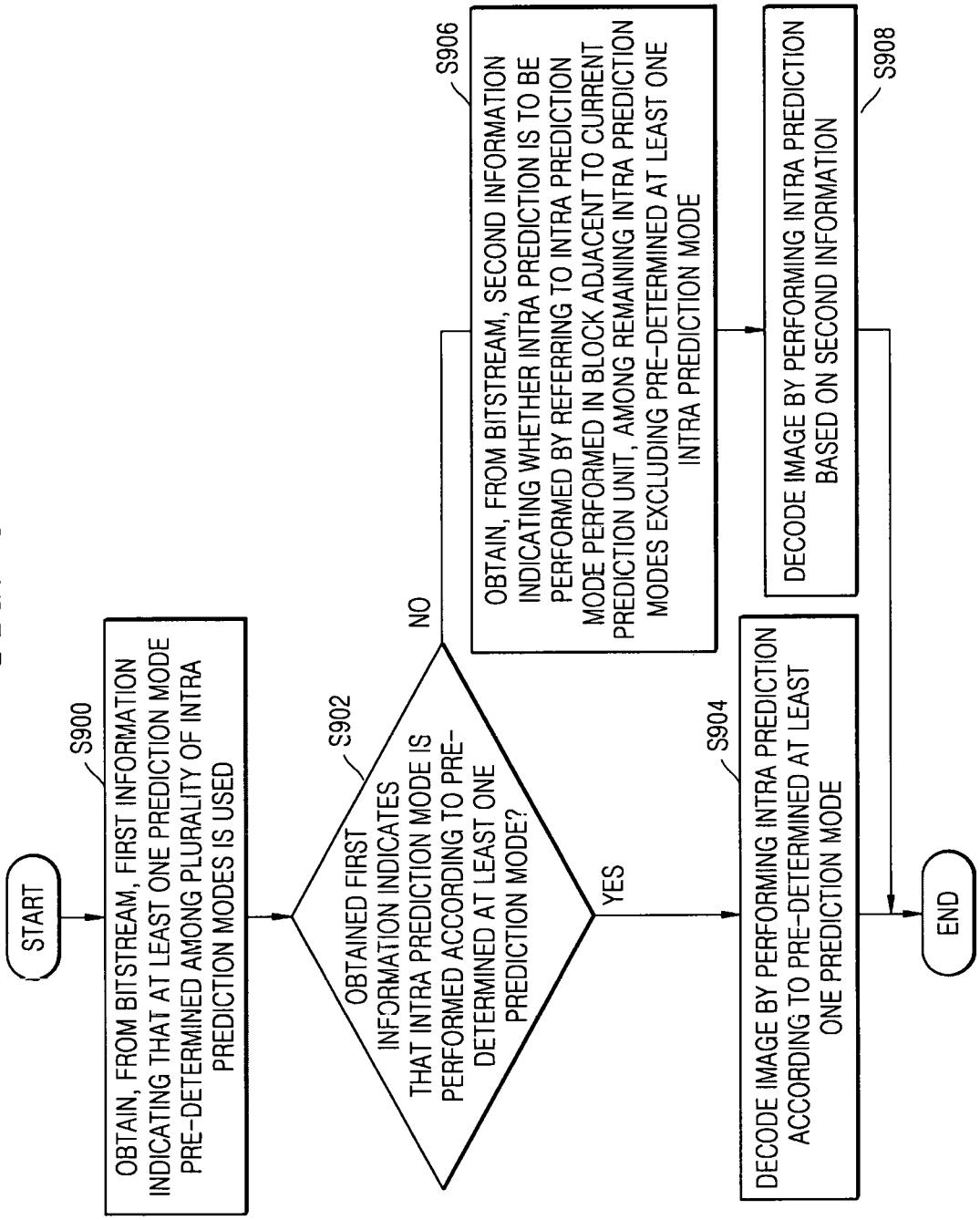
FIG. 9 is a flowchart of a method by which an image decoding apparatus determines one of intra prediction modes excluding pre-determined at least one prediction mode related to first information, by referring to an intra prediction mode of a neighboring block, according to an embodiment.

FIG. 9 is a flowchart of a method by which the image decoding apparatus 700 determines one of intra prediction modes excluding the pre-determined at least one prediction mode related to the first information, by referring to an intra prediction mode of a neighboring block, according to an embodiment.

Since features of operations S900 to S904 and S908 may correspond to similar features as those of operations S800 to S804 and S808 of FIG. 8, details thereof are not provided again.

When it is determined that the first information does, not indicate that the intra prediction mode is performed according to the pre-determined at least one prediction mode in operation S902, the decoder 720 may obtain, from the bitstream, the second information indicating whether the intra prediction is to be performed by referring to an intra prediction mode performed in the block adjacent to the current prediction unit, among remaining intra prediction modes excluding the pre-determined at least one intra prediction mode, in operation S906, according to an embodiment.

In other words, when the first information does not indicate that the intra prediction mode is performed according to the pre-determined at least one prediction mode, the decoder 120 may determine the intra prediction mode of the current prediction unit according to MPM, wherein intra prediction modes usable according to one of MPMs may not include the pre-determined at least one prediction mode related to the first information. For example, when the pre-determined at least one prediction mode related to the first information is a planar mode and a DC mode, the intra prediction mode indicatable in MPM may be one of the remaining intra prediction modes (for example, intra prediction modes having directivity (modes 2, 3, 4, and so on) excluding the planar mode (mode 0) and the DC mode (mode 1).

According to another embodiment, when the decoder 120 determines the intra prediction mode of the current prediction unit according to MPM, the intra prediction modes usable according to one of MPMs may include the pre-determined at least one prediction mode related to the first information. In other words, when the pre-determined at least one prediction mode related to the first information is a planar mode (mode 0) and a DC mode (mode 1), the intra prediction mode indicatable in MPM may be one of intra prediction modes (for example, a planar mode, a DC mode, and intra prediction modes having directivity (modes 2, 3, 4, and so on) including the planar mode and the DC mode.

According to an embodiment, when the decoder 120 determines the intra prediction mode of the current prediction unit according to MPM, the intra prediction modes usable according to one of MPMs may not include some of the pre-determined at least one prediction mode related to the first information. In this case, it should be limitedly interpreted that the pre-determined at least one prediction mode includes a plurality of intra prediction modes. According to an embodiment, when the pre-determined at least one prediction mode related to the first information is a planar mode, a DC mode, a vertical mode, and a horizontal mode, the intra prediction mode indicatable by MPM may be one of the remaining intra prediction modes (for example, a planar mode; a DC mode; and intra prediction modes excluding a vertical mode and a horizontal mode among intra prediction modes having directivity) excluding the vertical mode and the horizontal mode.

According to an embodiment, when the intra prediction mode of the current prediction unit is determined according to MPM, intra prediction modes usable according to one of MPMs may include new intra prediction modes instead of the pre-determined at least one prediction mode related to the first information.

However, features of the pre-determined at least one prediction mode related to the first information correspond to an embodiment for comparison of an intra prediction mode usable in MPM, and thus should not be interpreted limitedly to the above embodiments, and is broadly interpreted to include at least one of a plurality of intra prediction modes usable during image decoding processes.

Figure 7B:
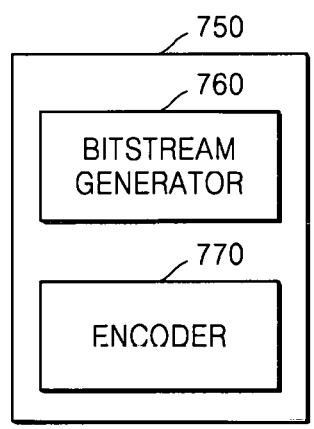
FIG. 7B is a block diagram of an image encoding apparatus for encoding an image by using first information indicating that intra prediction is performed by using pre-determined at least one prediction mode, according to an embodiment.

FIG. 7B is a block diagram of an image encoding apparatus 750 for encoding an image by using first information indicating that intra prediction is performed by using pre-determined at least one prediction mode, according to an embodiment.

According to an embodiment, the image decoding apparatus 700 may include a bitstream generator 760 and an encoder 770, wherein the bitstream generator 760 generates a bitstream including first information indicating that intra prediction is performed by using pre-determined at least one prediction mode and second information indicating whether intra prediction is to be performed by referring to an intra prediction mode performed in a block adjacent to a current prediction unit, and the encoder 770 encodes an image by performing intra prediction by using the pre-determined at least one prediction mode or by referring to the intra prediction mode performed in the block adjacent to the current prediction unit.

Since features of an image encoding method performed by the image encoding apparatus 750 may be features of similar or reverse processes of the image decoding method performed by the image decoding apparatus 700 described with reference to FIGS. 7A, 8, and 9, details thereof are not provided.

Hereinafter, a method by which the image decoding apparatus 100 according to an embodiment determines a data unit usable while decoding an image will be described with reference to FIGS. 10 through 23. Operations of the image encoding apparatus 150 may be similar to or reverse of various embodiments of operations of the image decoding apparatus 100.

It should be understood that processes of the image decoding apparatus 100 decoding an image in FIGS. 10 through 23 may also be performed by the image decoding apparatus 700 of FIG. 7A, according to an embodiment.

Figure 10:
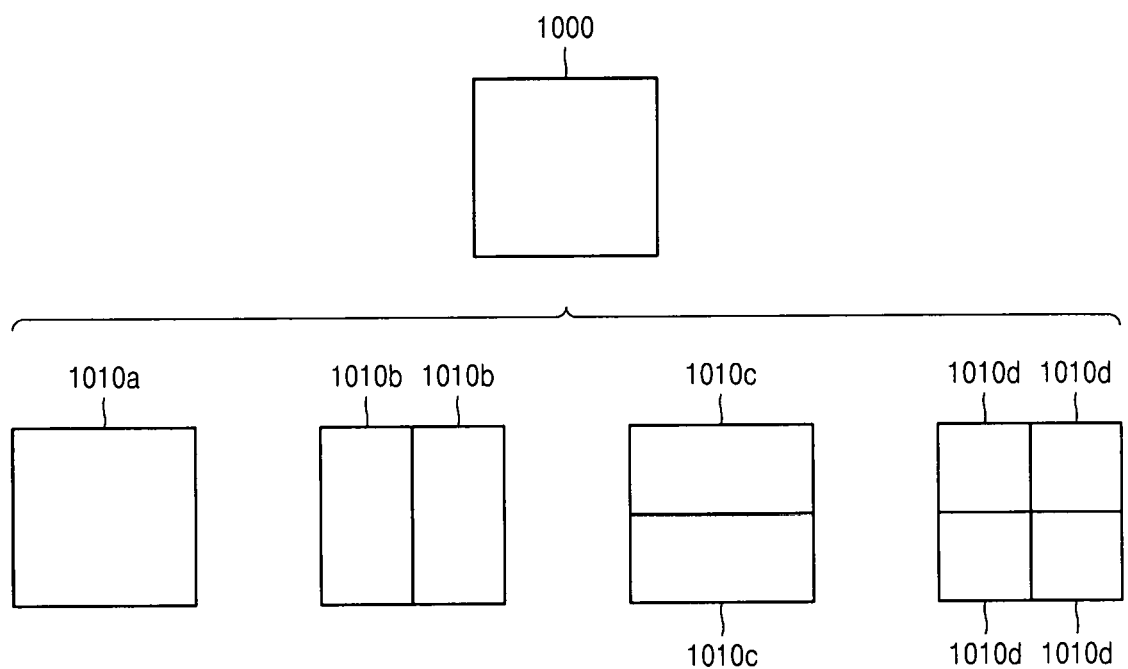
FIG. 10 illustrates processes of determining at least one coding unit as a current coding unit is split, according to an embodiment.

FIG. 10 illustrates processes of determining at least one coding unit as the image decoding apparatus 100 splits a current coding unit, according to an embodiment.

According to an embodiment, the image decoding apparatus 100 may determine a shape of a coding unit by using block shape information and determine a shape into which a coding unit is split by using split shape information. In other words, a split method of a coding unit, which is indicated by the split shape information, may be determined based on a block shape indicated by the block shape information used by the image decoding apparatus 100.

According to an embodiment, the image decoding apparatus 100 may use block shape information indicating that a current coding unit has a square shape. For example, the image decoding apparatus 100 may determine, according to split shape information, whether to not split a square coding unit, to split the square coding unit vertically, to split the square coding unit horizontally, or to split the square coding unit into four coding units. Referring to FIG. 10, when block shape information of a current coding unit 1000 indicates a square shape, the decoder 120 may not split a coding unit 1010*a* having the same size as the current coding unit 1000 according to split shape information indicating non-split, or determine coding units 1010*b*, 1010*c*, or 1010*d* based on split shape information indicating a certain split method.

Referring to FIG. 10, the image decoding apparatus 100 may determine two coding units 1010*b* by splitting the current coding unit 1000 in a vertical direction based on split shape information indicating a split in a vertical direction, according to an embodiment. The image decoding apparatus 100 may determine two coding units 1010*c* by splitting the current coding unit 1000 in a horizontal direction based on split shape information indicating a split in a horizontal direction. The image decoding apparatus 100 may determine four coding units 1010*d* by splitting the current coding unit 1000 in vertical and horizontal directions based on split shape information indicating splitting in vertical and horizontal directions. However, a split shape into which a square coding unit may be split is not limited to the above shapes and may include any shape indicatable by split shape information. Certain split shapes into which a square coding unit are split will now be described in detail through various embodiments.

FIG. 11 illustrates processes of determining at least one coding unit when the image decoding apparatus 100 splits a coding unit having a non-square shape, according to an embodiment.

According to an embodiment, the image decoding apparatus 100 may use block shape information indicating that a current coding unit has a non-square shape. The image decoding apparatus 100 may determine, according to split shape information, whether to not split the non-square current coding unit or to split the non-square current coding unit via a certain method. Referring to FIG. 11, when block shape information of a current coding unit 1100 or 1150 indicates a non-square shape, the image decoding apparatus 100 may not split coding units 1110 or 1160 having the same size as the current coding unit 1100 or 1150 according to split shape information indicating non-split, or determine coding units 1120*a*, 1120*b*, 1130*a*, 1130*b*, 1130*c*, 1170*a*, 1170*b*, 1180*a*, 1180*b*, and 1180*c* based on split shape information indicating a certain split method. A certain split method of splitting a non-square coding unit will now be described in detail through various embodiments.

According to an embodiment, the image decoding apparatus 100 may determine a shape into which a coding unit is split by using split shape information, and in this case, the split shape information may indicate the number of at least one coding unit generated as the coding unit is split. Referring to FIG. 11, when split shape information indicates that the current coding unit 1100 or 1150 is split into two coding units, the image decoding apparatus 100 may determine two coding units 1120*a* and 1120*b* or 1170*a* and 1170*b* included in the current coding unit 1100 or 1150 by splitting the current coding unit 1100 or 1150 based on the split shape information.

According to an embodiment, when the image decoding apparatus 100 splits the current coding unit 1100 or 1150 having a non-square shape based on split shape information, the image decoding apparatus 100 may split the current coding unit 1100 or 1150 considering locations of long sides of the current coding unit 1100 or 1150 having a non-square shape. For example, the image decoding apparatus 100 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split shape information indicates that a coding unit is split into an odd number of blocks, the image decoding apparatus 100 may determine the odd number of coding units included in the current coding unit 1100 or 1150. For example, when split shape information indicates that the current coding unit 1100 or 1150 is split into three coding units, the image decoding apparatus 100 may split the current coding unit 1100 or 1150 into three coding units 1130*a* through 1130*c* or 1180*a* through 1180*c*. According to an embodiment, the image decoding apparatus 100 may determine the odd number of coding units included in the current coding unit 1100 or 1150, and the sizes of the determined coding units may not be all the same. For example, the size of coding unit 1130*b* or 1180*b* from among the determined odd number of coding units 1130*a* through 1130*c* or 1180*a* through 1180*c* may be different from the sizes of coding units 1130*a* and 1130*c* or 1180*a* and 1180*c*. In other words, coding units that may be determined when the current coding unit 1100 or 1150 is split may have a plurality of types of sizes, and in some cases, the coding units 1130*a* through 1130*c* or 1180*a* through 1180*c* may have different sizes.

According to an embodiment, when split shape information indicates that a coding unit is split into an odd number of blocks, the image decoding apparatus 100 may determine the odd number of coding units included in the current coding unit 1100 or 1150, and in addition, may set a certain limit on at least one coding unit from among the odd number of coding units generated via splitting. Referring to FIG. 11, the image decoding apparatus 100 may differentiate decoding processes performed on the coding unit 1130*b* or 1180*b* located at the center from among the three coding units 1130*a* through 1130*c* or 1180*a* through 1180*c* generated as the current coding unit 1100 or 1150 is split from the other coding units 1130*a* and 1130*c* or 1180*a* and 1180*c*. For example, the image decoding apparatus 100 may limit the coding unit 1130*b* or 1180*b* located at the center to be no longer split unlike the other coding units 1130*a* and 1130*c* or 1180*a* and 1180*c*, or to be split only a certain number of times.

Figure 12:
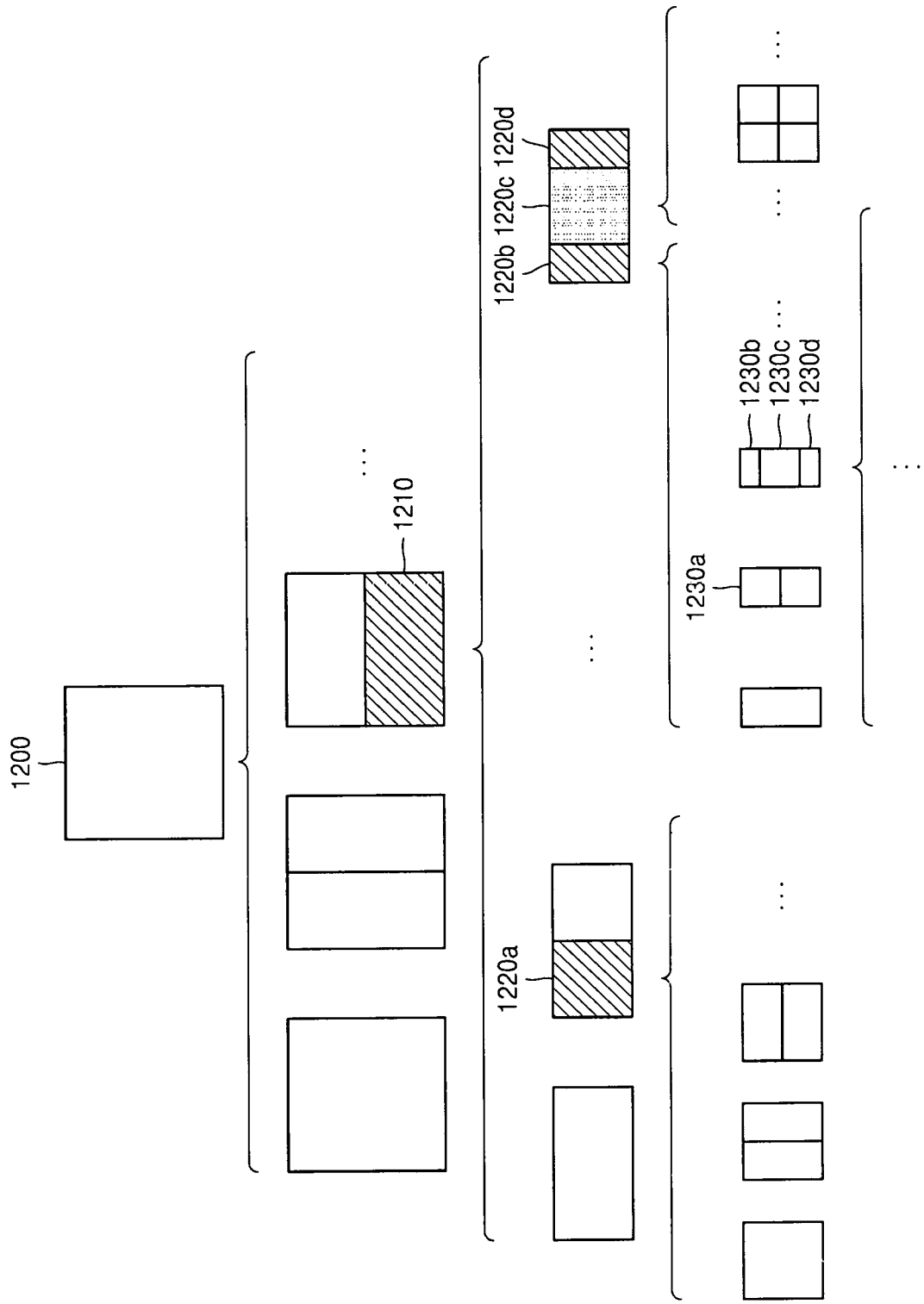
FIG. 12 illustrates processes of splitting a coding unit, based on at least one of a block shape information and split shape information, according to an embodiment.

FIG. 12 illustrates processes of the image decoding apparatus 100 splitting a coding unit, based on at least one of a block shape information and split shape information, according to an embodiment.

According to an embodiment, the image decoding apparatus 100 may determine that a first coding unit 1200 having a square shape is split or not split into coding units, based on at least one of block shape information and split shape information. According to an embodiment, when split shape information indicates that the first coding unit 1200 is split in a horizontal direction, the image decoding apparatus 100 may determine a second coding unit 1210 by splitting the first coding unit 1200 in a horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the image decoding apparatus 100 may determine that the determined second coding unit 1210 is split or not split into coding units based on at least one of block shape information and split shape information. Referring to FIG. 12, the image decoding apparatus 100 may split the second coding unit 1210, which has a non-square shape and is determined by splitting the first coding unit 1200, into at least one third coding unit 1210a, 1220b, 1220c, or 1220d, or may not split the second coding unit 1210, based on at least one of block shape information and split shape information. The image decoding apparatus 100 may obtain at least one of the block shape information and the split shape information, and obtain a plurality of second coding units (for example, the second coding units 1210) having various shapes by splitting the first coding unit 1200 based on at least one of the obtained block shape information and split shape information, wherein the second coding unit 1210 may be split according to a method of splitting the first coding unit 1200 based on at least one of the block shape information and the split shape information. According to an embodiment, when the first coding unit 1200 is split into the second coding units 1210 based on at least one of block shape information and split shape information with respect to the first coding unit 1200, the second coding unit 1210 may also be split into third coding units (for example, the third coding units 1220a through 1220d) based on at least one of block shape information and split shape information with respect to the second coding unit 1210. In other words, a coding unit may be recursively split based on at least one of split shape information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220b through 1220d determined, when the second coding unit 1210 having a non-square shape is split may be recursively split. According to an embodiment, the third coding unit 1220c having a square shape from among the third coding units 1220b through 1220d may be split in a horizontal direction into a plurality of fourth coding units. A fourth coding unit having a non-square shape from among the plurality of fourth coding units may again be split into a plurality of coding units. For example, the fourth coding unit having a non-square shape may be split into an odd number of coding units.

A method that may be used to recursively split a coding unit will be described below through various embodiments.

According to an embodiment, the image decoding apparatus 100 may determine that each of the third coding units 1220a through 1220d is split into coding units or that the second coding unit 1210 is not split, based on at least one of block shape information and split shape information. The image decoding apparatus 100 may split the second coding unit 1210 having a non-square shape into the odd number of third coding units 1220b through 1220d, according to an embodiment. The image decoding apparatus 100 may set a certain limit on a certain third coding unit from among the third coding units 1220b through 1220d. For example, the image decoding apparatus 100 may limit that the third coding unit 1220c located at the center of the third coding units 1220b through 1220d is no longer split, or is split into a settable number of times. Referring to FIG. 12, the image decoding apparatus 100 may limit that the third coding unit 1220c located at the center of the third coding units 1220b through 1220d included in the second coding unit 1210 having a non-square shape is no longer split, is split into a certain split shape (for example, is split into four coding units or split into shapes corresponding to those into which the second coding unit 1210 is split), or is split only a certain number of times (for example, split only n times wherein n>0). However, such limits on the third coding unit 1220c located at the center are only examples and should not be interpreted as being limited by those examples, but should be interpreted as including various limits as long as the third coding unit 1220c located at the center is decoded differently from the other third coding units 1220b and 1220d.

According to an embodiment, the image decoding apparatus 100 may obtain at least one of block shape information and split shape information used to split a current coding unit from a certain location in the current coding unit.

Figure 13:
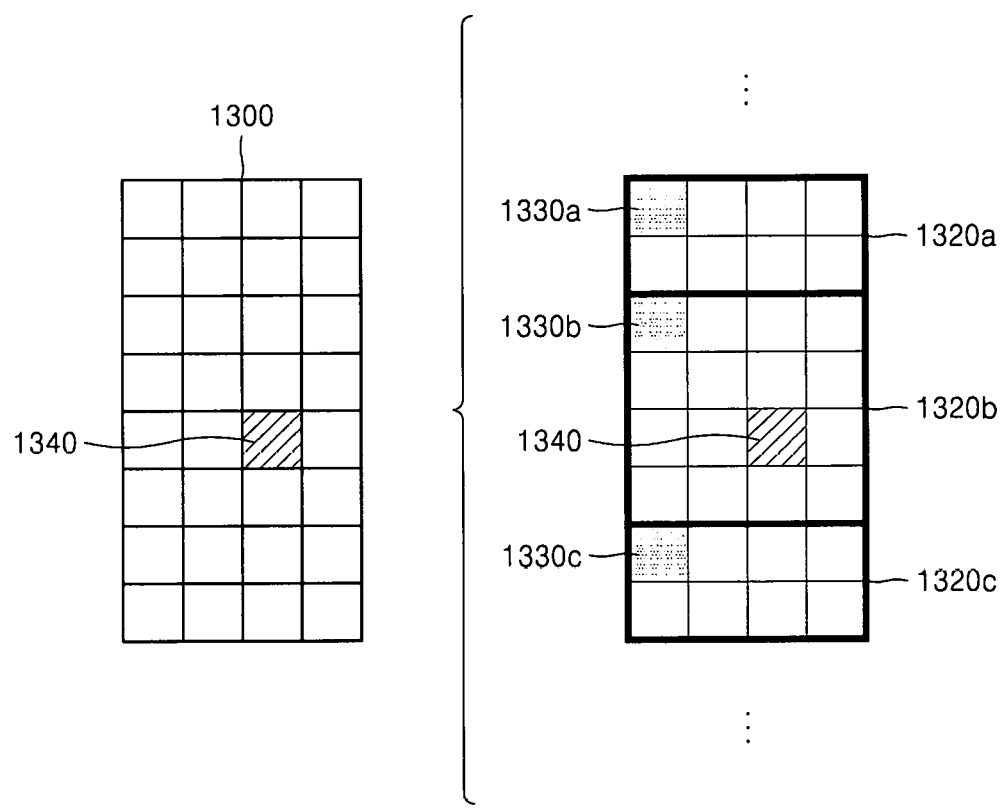
FIG. 13 illustrates a method of determining a certain coding unit from among an odd number of coding units, according to an embodiment.

FIG. 13 illustrates a method of determining, by the image decoding apparatus 100, a certain coding unit from among an odd number of coding units, according to an embodiment. Referring to FIG. 13, at least one of block shape information and split shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding apparatus 100 may determine that a current coding unit is split into coding units having various shapes and sizes or is not split by obtaining at least one of block shape information and split shape information from a certain location.

According to an embodiment, the image decoding apparatus 100 may select one coding unit when a current coding unit is split into a certain number of coding units. A method of selecting one of a plurality of coding units may vary, and details thereof will be described below through various embodiments.

According to an embodiment, the image decoding apparatus 100 may split a current coding unit into a plurality of coding units and determine a coding unit at a certain location.

FIG. 13 illustrates a method of determining, by the image decoding apparatus 100, a coding unit at a certain location from among an odd number of coding units, according to an embodiment.

According to an embodiment, the image decoding apparatus 100 may use information indicating a location of each of the odd number of coding units so as to determine a coding unit located at the center from among the odd number of coding units. Referring to FIG. 13, the image decoding apparatus 100 may determine the odd number of coding units 1320a through 1320c by splitting the current coding unit 1300. The image decoding apparatus 100 may determine the center coding unit 1320b by using information about the locations of the odd number of coding units 1320a through 1320c. For example, the image decoding apparatus 100 may determine the coding unit 1320b located at the center by determining the locations of the coding units 1320a through 1320b based on information indicating locations of certain samples included in the coding units 1320a through 1320c. In detail, the image decoding apparatus 100 may determine the coding unit 1320b located at the center by determining the locations of the coding units 1320a through 1320c based on information indicating locations of upper left samples 1330a through 1330c of the coding units 1320a through 1320c.

According to an embodiment, the information indicating the locations of the upper left samples 1330a through 1330c included in the coding units 1320a through 1320c respectively may include information about a location or coordinates of the coding units 1320a through 1320c in a picture. According to an embodiment, the information indicating the locations of the upper left samples 1330a through 1330c included in the coding units 1320a through 1320c respectively may include information indicating widths or heights of the coding units 1320a through 1320c included in the current coding unit 1300, and such widths or heights may correspond to information indicating differences between coordinates of the coding units 1320a through 1320c in a picture. In other words, the image decoding apparatus 100 may determine the coding unit 1320b located at the center by directly using the information about the locations or coordinates of the coding units 1320a through 1320c in a picture or by using information about the widths or heights of the coding units 1320a through 1320c corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The image decoding apparatus 100 may determine the center coding unit 1320b by using the coordinates of the upper left samples 1330a through 1330c respectively included in the coding units 1320a through 1320c. For example, when the coordinates of the upper left samples 1330a through 1330c are arranged in an ascending order or descending order, the coding unit 1320b including the coordinates (xb, yb) of the sample 1330b located at the center may be determined as a coding unit located at the center from among the coding units 1320a through. 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding apparatus 100 may split the current coding unit 1300 into the plurality of coding units 1320a through 1320c and select a coding unit from the coding units 1320a through 1320c according to a certain standard. For example, the image decoding apparatus 100 may select the coding unit 1320b having a different size from among the coding units 1320a through 1320c.

According to an embodiment, the image decoding apparatus 100 may determine widths or heights of the coding units 1320a through 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The image decoding apparatus 100 may determine the sizes of the coding units 1320a through 1320c by respectively using the coordinates (xa, ya), (xb, yb), and (xc, yc) indicating the locations of the coding units 1320a through 1320c.

According to an embodiment, the image decoding apparatus 100 may determine the width of the upper coding unit 1320a to be xb-xa and the height to be yb-ya. According to an embodiment, the image decoding apparatus 100 may determine the width of the center coding unit 1320b to be xc-xb and the height to be yc-yb. According to an embodiment, the image decoding apparatus 100 may determine the width or height of the lower coding unit 1320c by using the width and height of the current coding unit 1300 and the widths and heights of the upper coding unit 1320a and the center coding unit 1320b. The image decoding apparatus 100 may determine a coding unit having a different size from other coding units based on the determined widths and heights of the coding units 1320a through 1320c. Referring to FIG. 13, the image decoding apparatus 100 may determine the center coding unit 1320b having a size different from those of the upper coding unit 1320a and the lower coding unit 1320c as a coding unit at a certain location. However, processes of the image decoding apparatus 100 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding apparatus 100 may select a coding unit at a certain location from among an odd number of coding units determined when a current coding unit is split, while considering a shape of the current coding unit. For example, when the current coding unit has a non-square shape in which a width is longer than a height, the image decoding apparatus 100 may determine a coding unit at a certain location in a horizontal direction. In other words, the image decoding apparatus 100 may determine one of the coding units having a different location in the horizontal direction and set a limit on the one coding unit. When the current coding unit has a non-square shape in which a height is longer than a width, the image decoding apparatus 100 may determine a coding unit at a certain location in a vertical direction. In other words, the image decoding apparatus 100 may determine one of the coding units having a different location in the vertical direction and set a limit on the one coding unit.

According town embodiment, the image decoding apparatus 100 may use information indicating a location of each of an even number of coding units so as to determine a coding unit at a certain location from among the even number of coding units. The image decoding apparatus 100 may determine the even number of coding units by splitting a current coding unit and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the image decoding apparatus 100 may use at least one of block shape information and split shape information stored in a sample included in a center coding unit during splitting processes so as to determine a coding unit located at the center from among a plurality of coding units obtained by splitting a current coding unit.

Referring to FIG. 13, the image decoding apparatus 100 may split the current coding unit 1300 into the plurality of coding units 1320a through 1320c based on at least one of block shape information and split shape information and determine the coding unit 1320b located at the center from among the plurality of coding units 1320a through 1320c. In addition, the image decoding apparatus 100 may determine the coding unit 1320b located at the center considering a location from which at least one of the block shape information and the split shape information is obtained. In other words, at least one of the block shape information and the split shape information of the current coding unit 1300 may be obtained from the sample 1340 located at the center of the current coding unit 1300, and when the current coding unit 1300 is split into the plurality of coding units 1320a through 1320c based on at least one of the block shape information and the split shape information, the coding unit 1320b including the sample 1340 may be determined as a coding unit located at the center. However, information used to determine a coding unit located at the center is not limited to at least one of the block shape information and the split shape information, and various types of information may be used while determining a coding unit located at the center.

According to an embodiment, certain information for identifying a coding unit at a certain location may be obtained from a certain sample included in a coding unit to be determined. Referring to FIG. 13, the image decoding apparatus 100 may use at least one of block shape information and split shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a through 1320c determined when the current coding unit 1300 is split. In other words, the image decoding apparatus 100 may determine the sample at the certain location considering a block shape of the current coding unit 1300 and determine and set a certain limit on the coding unit 1320b including a sample from which certain information (for example, at least one of block shape information and split shape information) is obtainable, from among the plurality of coding units 1320a through 1320c determined when the current coding unit 1300 is split. Referring to FIG. 13, according to an embodiment, the image decoding apparatus 100 may determine, as a sample from which certain information is obtainable, the sample 1340 located at the center of the current coding unit 1300 and set a certain limit on the coding unit 1320b including such a sample 1340 during decoding processes. However, a location of a sample from which certain information is obtainable is not limited to the above and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square and determine a location of a sample from which certain information is obtainable according to the shape. For example, the image decoding apparatus 100 may determine, as a sample from which certain information is obtainable, a sample located on a boundary of splitting at least one of a width and, a height of a current coding unit into halves by using at least one of information about the width of the current coding unit and information about the height of the current coding unit. As another example, when block shape information related to a current coding unit indicates a non-square shape, the image decoding apparatus 100 may determine, as a sample from which certain information is obtainable, one of samples adjacent to a boundary of splitting long sides of the current coding unit into halves.

According to an embodiment, when a current coding unit is split into a plurality of coding units, the image decoding apparatus 100 may use at least one of block shape information and split shape information so as to determine a coding unit at a certain location from among the plurality of coding units. According to an embodiment, the image decoding apparatus 100 may obtain at least one of block shape information and split shape information from a sample at a certain location included in a coding unit, and may split a plurality of coding units generated as a current coding unit is split by using at least one of the split shape information and the block shape information obtained from the sample at the certain location included in each of the plurality of coding units. In other words, a coding unit may be recursively split by using at least one of block shape information and split shape information obtained from a sample at a certain location included in each coding unit. Since processes of recursively splitting a coding unit have been described above with reference to FIG. 12, details thereof are not provided again.

According to an embodiment, the image decoding apparatus 100 may determine at least one coding unit by splitting a current coding unit and determine an order of decoding the at least one coding unit according to a certain block (for example, the current coding unit).

Figure 14:
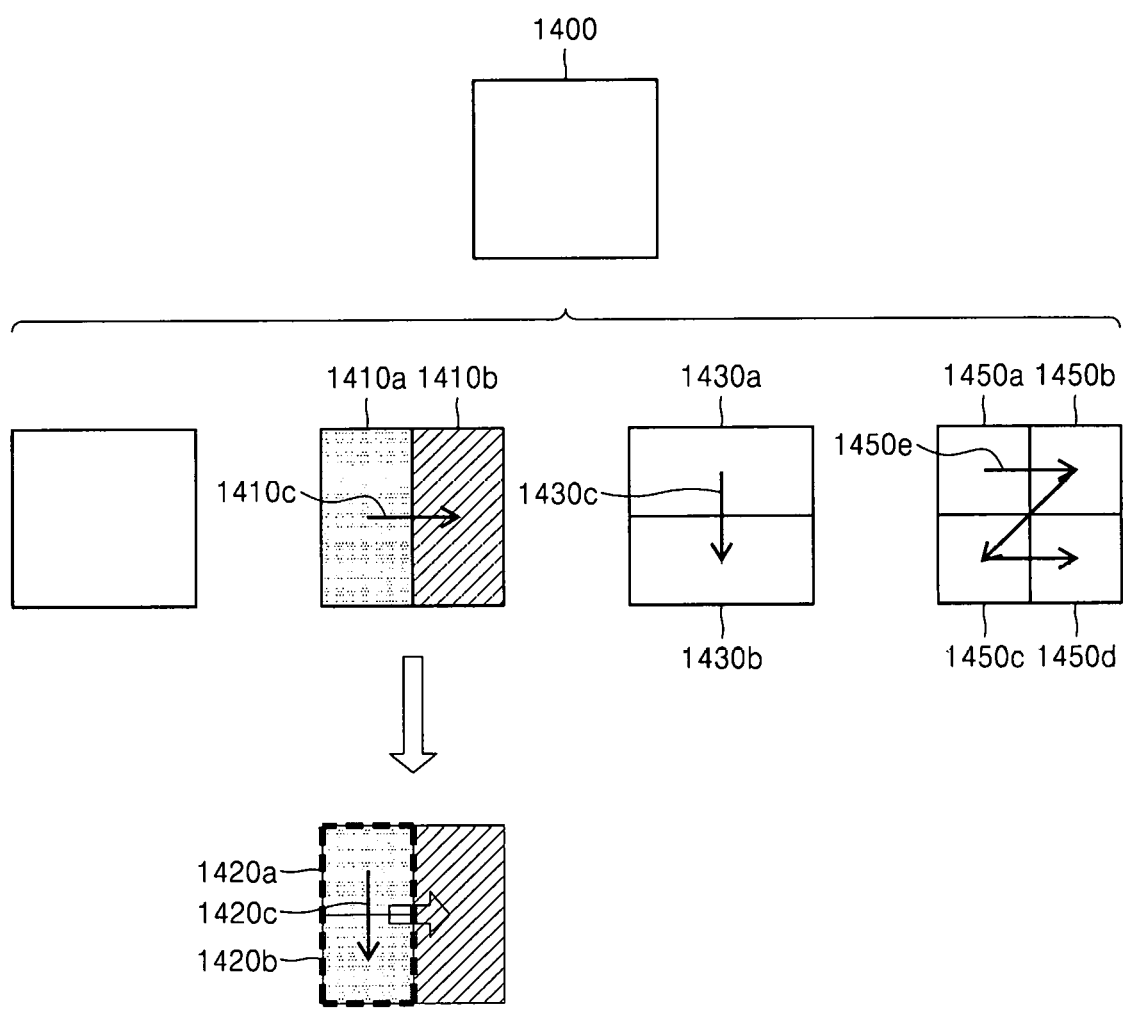
FIG. 14 illustrates an order of processing a plurality of coding units when the plurality of coding units are determined when a current coding unit is split, according to an embodiment.

FIG. 14 illustrates an order of processing a plurality of coding units when the plurality of coding units are determined when the image decoding apparatus 100 splits a current coding unit, according to an embodiment.

According to an embodiment, the image decoding apparatus 100 may determine second coding units 1410a and 1410b by splitting a first coding unit 1400 in a vertical direction, determine second coding units 1430a and 1430b by splitting the first coding unit 1400 in a horizontal direction, or determine second coding units 1450a through 1450d by splitting the first coding unit 140 in horizontal and vertical directions, according to block shape information and split shape information.

Referring to FIG. 14, the image decoding apparatus 100 may determine the second coding units 1410a and 1410b, which are determined by splitting the first coding unit 1400 in the vertical direction, to be processed in a horizontal direction 1410c. The image decoding apparatus 100 may determine the second coding units 1430a and 1430b, which are determined by splitting the first coding unit 1400 in the horizontal direction, to be processed in a vertical direction 1430*c*. The image decoding apparatus 100 may determine the second coding units 1450*a* through 1450*d*, which are determined by splitting the first coding unit 1400 in the vertical and horizontal directions, according to a certain order in which coding units located in one row is processed and then coding units located in a next row is processed (for example, a raster scan order or a z-scan order 1450*e*).

According to an embodiment, the image decoding apparatus 100 may recursively split coding units. Referring to FIG. 14, the image decoding apparatus 100 may determine the plurality of second coding units 1410*a* and 1410*b*, 1430*a* and 1430*b*, or 1450*a* through 1450*d* by splitting the first coding unit 1400, and recursively split each of the plurality of second coding units 1410*a* and 1410*b*, 1430*a* and 1430*b*, or 1450*a* through 1450*d*. A method of splitting the plurality of second coding units 1410*a* and 1410*b*, 1430*a* and 1430*b*, or 1450*a* through 1450*d* may correspond to a method of splitting the first coding unit 1400. Accordingly, each of the plurality of second coding units 1410*a* and 1410*b*, 1430*a* and 1430*b*, or 1450*a* through 1450*d* may be independently split into a plurality of coding units. Referring to FIG. 14, the image decoding apparatus 100 may determine the second coding units 1410*a* and 1410*b* by splitting the first coding unit 1400 in the vertical direction, and in addition, determine that each of the second coding units 1410*a* and 1410*b* is independently split or not split.

According to an embodiment, the image decoding apparatus 100 may split the second coding unit 1410*a* at the left in a horizontal direction into third coding units 1420*a* and 1420*b* and may not split the second coding unit 1410*b* at the right.

According to an embodiment, an order of processing coding units may be determined based on split processes of coding units. In other words, an order of processing coding units that are split may be determined based on an order of processing coding units before being split. The image decoding apparatus 100 may determine an order of processing the third coding units 1420*a* and 1420*b* determined when the second coding unit 1410*a* at the left is split independently from the second coding unit 1410*b* at the right. Since the third coding units 1420*a* and 1420*b* are determined when the second coding unit 1410*a* at the left is split in a horizontal direction, the third coding units 1420*a* and 1420*b* may be processed in a vertical direction 1420*c*. Also, since an order of processing the second coding unit 1410*a* at the left and the second coding unit 1410*b* at the right corresponds to the horizontal direction 1410*c*, the second coding unit 1410*b* at the right may be processed after the third coding units 1420*a* and 1420*b* included in the second coding unit 1410*a* at the left are processed in the vertical direction 1420*c*. The above descriptions are related processes of determining an order of processing coding units according to coding units before being split, but such processes are not limited to the above embodiments, and any method of independently processing, in a certain order, coding units split into various shapes may be used.

Figure 15:
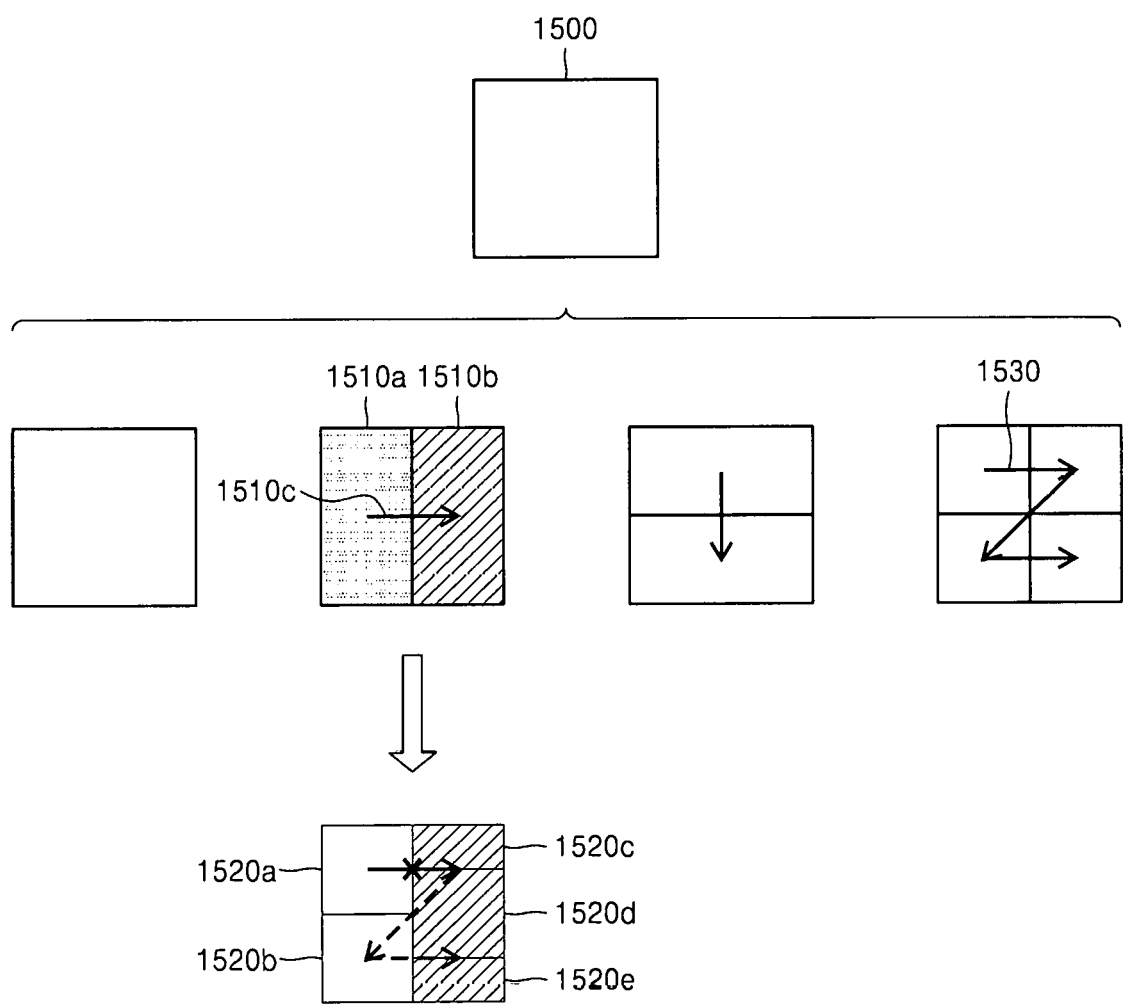
FIG. 15 illustrates processes of determining that a current coding unit is split into an odd number of coding units when coding units are not processable in a certain order, according to an embodiment.

FIG. 15 illustrates processes of determining that a current coding unit is split into an odd number of coding units when coding units are not processable in a certain order by the image decoding apparatus 100, according to an embodiment.

According to an embodiment, the image decoding apparatus 100 may determine that a current coding unit is split into an odd number of coding units based on obtained block shape information and split shape information. Referring to FIG. 15, a first coding unit 1500 having a square shape may be split into second coding units 1510*a* and 1510*b* having a non-square shape, and the second coding units 1510*a* and 1510*b* may be independently respectively split into third coding units 1520*a* and 1520*b*, and 1520*c* through 1520*e*. According to an embodiment, the image decoding apparatus 100 may split the second coding unit 1510*a* at the left from among the second coding units 1510*a* and 1510*b* into a horizontal direction to determine the plurality of third coding units 1520*a* and 1520*b*, and split the second coding unit 1510*b* at the right into the odd number of third coding units 1520*c* through 1520*e*.

According to an embodiment, the image decoding apparatus 100 may determine whether a coding unit split into an odd number exists by determining whether the third coding units 1520*a* through 1520*e* are processable in a certain order. Referring to FIG. 15, the image decoding apparatus 100 may determine the third coding units 1520*a* through 1520*e* by recursively splitting the first coding unit 1500. The image decoding apparatus 100 may determine, based on at least one of block shape information and split shape information, whether a coding unit is split into an odd number from among shapes into which the first coding unit 1500, the second coding units 1510*a* and 1510*b*, or the third coding units 1520*a*, through 1520*e* are split. For example, the second coding unit 1510*b* at the right from among the second coding units 1510*a* and 1510*b* may be split into the odd number of third coding units 1520*c* through 1520*e*. An order of processing a plurality of coding units included in the first coding unit 1500 may be a certain order (for example, a z-scan order 1530), and the image decoding apparatus 100 may determine whether the third coding units 1520*c* through 1520*e* determined when the second coding unit 1510*b* at the right is split into an odd number satisfy a condition of being processable according to the certain order.

According to an embodiment, the image decoding apparatus 100 may determine whether the third coding units 1520*a* through 1520*e* included in the first coding unit 1500 satisfy a condition of being processable according to a certain order, wherein the condition is related to whether at least one of a width and a height of each of the second coding units 1510*a* and 1510*b* is split into halves according to boundaries of the third coding units 1520*a* through 1520*e*. For example, the third coding units 1520*a* and 1520*b* determined when the height of the second coding unit 1510*a* at the left and having a non-square shape is split into halves satisfy the condition, but it may be determined that the third coding units 1520*c* through 1520*e* do not satisfy the condition because the boundaries of the third coding units 1520*c* through 1520*e* that are determined when the second coding unit 1510*b* at the right is split into three coding units do not split the width or height of the second coding unit 1510*b* at the right into halves. The image decoding apparatus 100 may determine disconnection of a scan order when the condition is not satisfied and determine that the second coding unit 1510*b* at the right is split into the odd number of coding units, based on a result of the determination. According to an embodiment, the image decoding apparatus 100 may set a certain limit on a coding unit at a certain location from among an odd number of coding units obtained by splitting a coding unit, and since such a limit or certain location has been described above through various embodiments, details thereof are not provided again.

Figure 16:
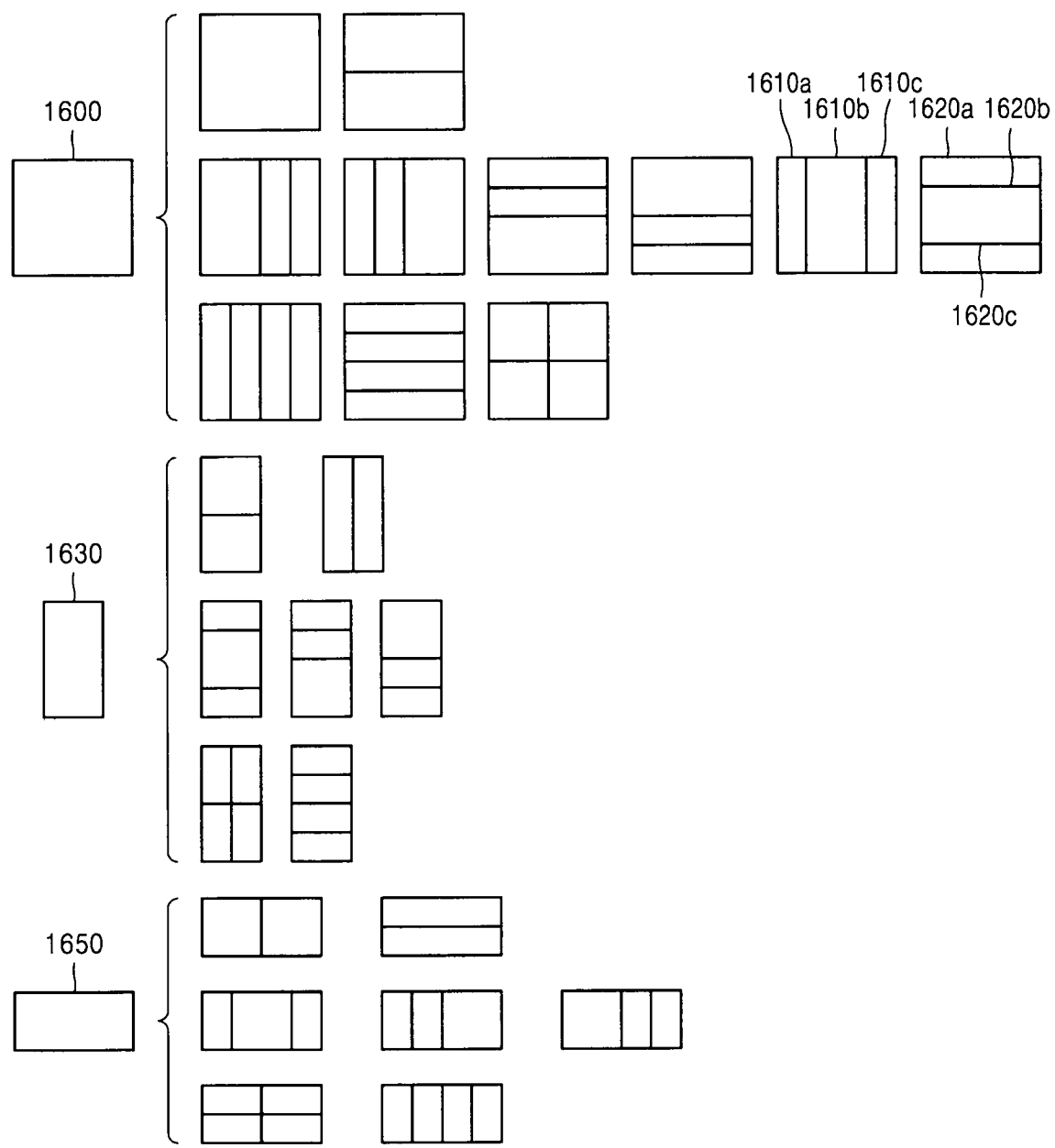
FIG. 16 illustrates processes of determining at least one coding unit when a first coding unit is split, according to an embodiment.

FIG. 16 illustrates processes of determining at least one coding unit when the image decoding apparatus 100 splits a first coding unit 1600, according to an embodiment. According to an embodiment, a receiver of the image decoding apparatus 100 may split the first coding unit 1600 based on at least one of obtained block shape information and split shape information obtained. The first coding unit 1600 having a square shape may be split into four coding units having a square shape or a plurality of coding units having a non-square shape. For example, referring to FIG. 16, when block shape information indicates that the first coding unit 1600 is a square and split shape information indicates a split into non-square coding units, the image decoding apparatus 100 may split the first coding unit 1600 into a plurality of non-square coding units. In detail, when split shape information indicates that an odd number of coding units are determined by splitting the first coding unit 1600 in a horizontal direction or a vertical direction, the image decoding apparatus 100 may determine, as the odd number of coding units, second coding units 1610*a* through 1610*c* by splitting the first coding unit 1600 having a square shape in a vertical direction, or second coding units 1620*a* through 1620*c* by splitting the first coding unit 1600 in a horizontal direction.

According to an embodiment, the image decoding apparatus 100 may determine whether the second coding units 1610*a* through 1610*c* and 1620*a* through 1620*c* included in the first coding unit 1600 satisfy a condition of being processable in a certain order, wherein the condition is related to whether at least one of a width and a height of the first coding unit 1600 is split into halves according to boundaries of the second coding units 1610*a* through 1610*c* and 1620*a* through 1620*c*. Referring to FIG. 16, since the boundaries of the second coding units 1610*a* through 1610*c* determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620*a* through 1620*c* determined when the first coding unit 1600 having a square shape is split in a horizontal direction do not split the height of the first coding unit 1600 into halves, it may be determined that the first coding unit 1600 does not satisfy the condition of being processable in a certain order. The image decoding apparatus 100 may determine disconnection of a scan order when the condition is not satisfied and determine that the first coding unit 1600 is split into the odd number of coding units based on a result of the determination. According to an embodiment, the image decoding apparatus 100 may set a certain limit on a coding unit at a certain location from among an odd number of coding units obtained by splitting a coding unit, and since such a limit or certain location has been described above through various embodiments, details thereof are not provided again.

According to an embodiment, the image decoding apparatus 100 may determine coding units having various shapes by splitting a first coding unit.

Referring to FIG. 16, the image decoding apparatus 100 may split the first coding unit 1600 having a square shape and a first coding unit 1630 or 1650 having a non-square shape into coding units having various shapes.

Figure 17:
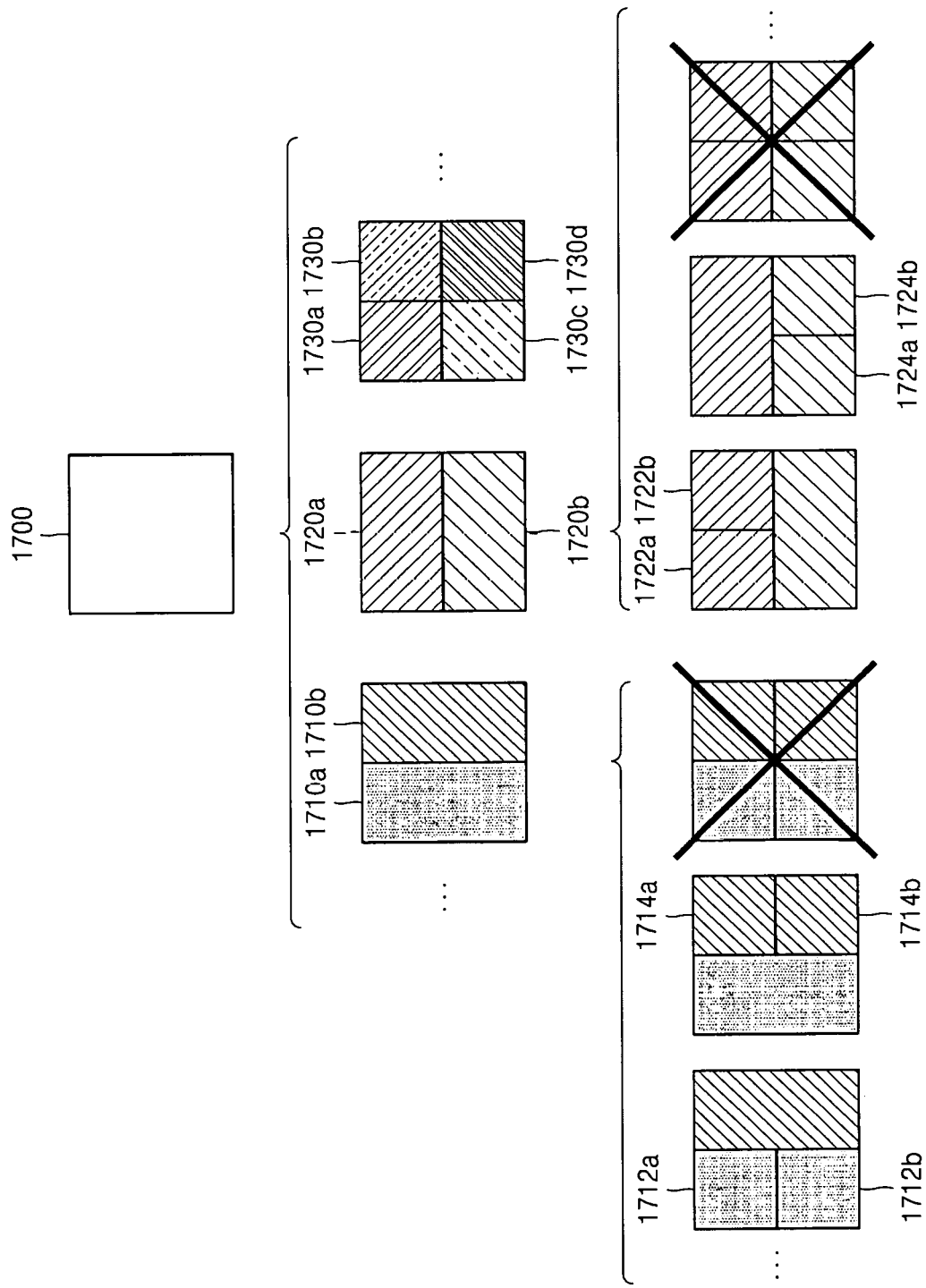
FIG. 17 illustrates that a shape into which a second coding unit is splittable is restricted when the second coding unit having a non-square shape determined when a first coding unit is split satisfies a certain condition, according to an embodiment.

FIG. 17 illustrates that a shape into which a second coding unit is splittable by the image decoding apparatus 100 is restricted when the second coding unit having a non-square shape determined when a first coding unit 1700 is split satisfies a certain condition, according to an embodiment.

According to an embodiment, the image decoding apparatus 100 may determine that the first coding unit 1700 having a square shape is split into second coding units 1710*a* and 1710*b* or 1720*a* and 1720*b* having a non-square shape, based on at least one of block shape information and split shape information obtained through the receiver. The second coding units 1710*a* and 1710*b* or 1720*a* and 1720*b* may be independently split. Accordingly, the image decoding apparatus 100 may determine that the second coding units 1710*a* and 1710*b* or 1720*a* and 1720*b* are split into a plurality of coding units or are not split based on at least one of block shape information and split shape information related to each of the coding units 1710*a* and 1710*b* or 1720*a* and 1720*b*. According to an embodiment, the image decoding apparatus 100 may determine third coding units 1712*a* and 1712*b* by splitting, in a horizontal direction, the second coding unit 1710*a* at the left having a non-square shape, which is determined when the first coding unit 1700 is split in a vertical direction. However, when the second coding unit 1710*a* at the left is split in the horizontal direction, the image decoding apparatus 100 may set a limit that the second coding unit 1710*b* at the right is not split in the horizontal direction like the second coding unit 1710*a* at the left. When third coding units 1714*a* and 1714*b* are determined when the second coding unit 1710*b* at the right is split in the same direction, i.e., the horizontal direction, the third coding units 1712*a*, 1712*b*, 1714*a*, and 1714*b* are determined when the second coding units 1710*a* at the left and the second coding unit 1710*b* at the right are each independently split in the horizontal direction. However, this is the same result as splitting the first coding unit 1700 into four second coding units 1730*a* through 1730*d* having a square shape based on at least one of block shape information and split shape information, and thus may be inefficient in terms of image decoding.

According to an embodiment, the image decoding apparatus 100 may determine third coding units 1722*a* and 1722*b* or 1724*a*, and 1724*b* by splitting, in a vertical direction, the second coding unit 1720*a* or 1720*b* having a non-square shape determined when the first coding unit 1700 is split in the horizontal direction. However, when one of second coding units (for example, the second coding unit 1720*a* at the top) is split in a vertical direction, the image decoding apparatus 100 may set a limit that the other second coding unit (for example, the second coding unit 1720*b* at the bottom) is not split in the vertical direction like the second coding unit 1720*a* at the top for the above described reasons.

Figure 18:
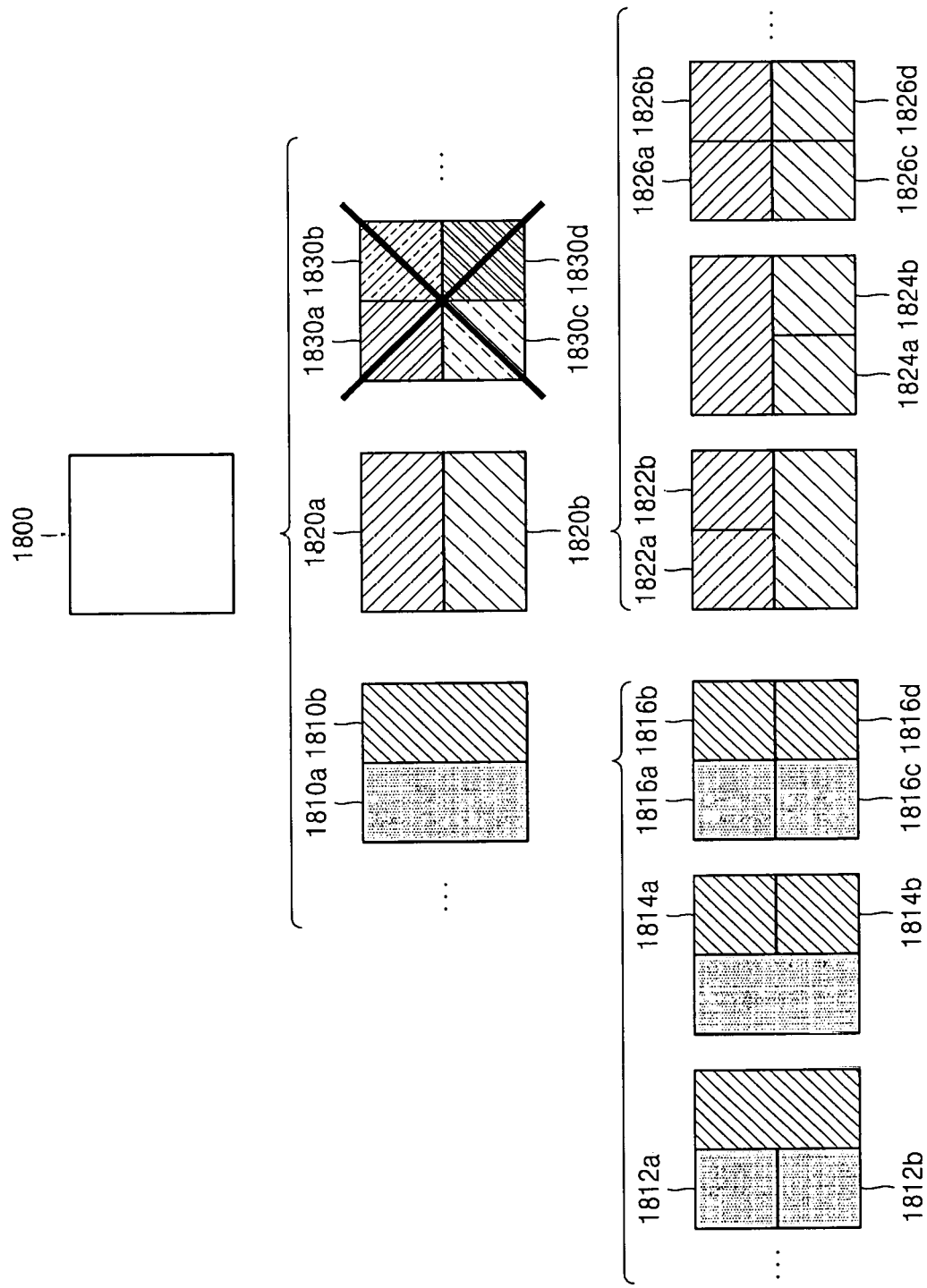
FIG. 18 illustrates processes of splitting a coding unit having a square shape when split shape information is unable to indicate that a coding unit is split into four square shapes, according to an embodiment.

FIG. 18 illustrates processes of the image decoding apparatus 100 splitting a coding unit having a square shape when split shape information is unable to indicate that a coding unit is split into four square shapes, according to an embodiment.

According to an embodiment, the image decoding apparatus 100 may determine second coding units 1810*a* and 1810*b*, or 1820*a* and 1820*b*, by splitting a first coding unit 1800 based on at least one of block shape information and split shape information. Split shape information may include information about various shapes into which a coding unit may be split, but such information about various shapes may not include information for splitting a coding unit into four square coding units. According to such split shape information, the image decoding apparatus 100 is unable to split the first coding unit 1800 having a square shape into four second coding units 1830 through 1830*d* having a square shape. The image decoding apparatus 100 may determine the second coding units 1810*a* and 1810*b*, or 1820*a* and 1820*b* having a non-square shape based on the split shape information.

According to an embodiment, the image decoding apparatus 100 may independently split each of the second coding units 1810*a* and 1810*b*, or 1820*a* and 1820*b* having a non-square shape. Each of the second coding units 1810*a* and 1810*b*, or 1820*a* and 1820*b* may be split in a certain order via a recursive method that may be a split method corresponding to a method of splitting the first coding unit 1800 based on at least one of the block shape information and the split shape information.

For example, the image decoding apparatus 100 may determine third coding units 1812*a* and 1812*b* having a square shape by splitting the second coding unit 1810*a* at the left in a horizontal direction, or determine third coding units 1814*a* and 1814*b* having a square shape by splitting the second coding unit 1810*b* at the right in a horizontal direction. In addition, the image decoding apparatus 100 may determine third coding units 1816*a* through 1816*d* having a square shape by splitting both the second coding unit 1810*a* at the left and the second coding unit 1810*b* at the right in the horizontal direction. In this case, coding units may be determined in the same manner as when the first coding unit 1800 is split into four second coding units 1830*a* through 1830*d* having a square shape.

As another example, the image decoding apparatus 100 may determine third coding units 1822*a* and 1822*b* having a square shape by splitting the second coding unit 1820*a* at the top in a vertical direction and determine third coding units 1824*a* and 1824*b* having a square shape by splitting the second coding unit 1820*b* at the bottom in a vertical direction. In addition, the image decoding apparatus 100 may determine third coding units 1826*a* through 1826*d* having a square shape by splitting both the second coding unit 1820*a* at the top and the second coding unit 1820*b* at the bottom in the vertical direction. In this case, coding units may be determined in the same manner as when the first coding unit 1800 is split into four second coding units 1830*a* through 1830*d* having a square shape.

Figure 19:
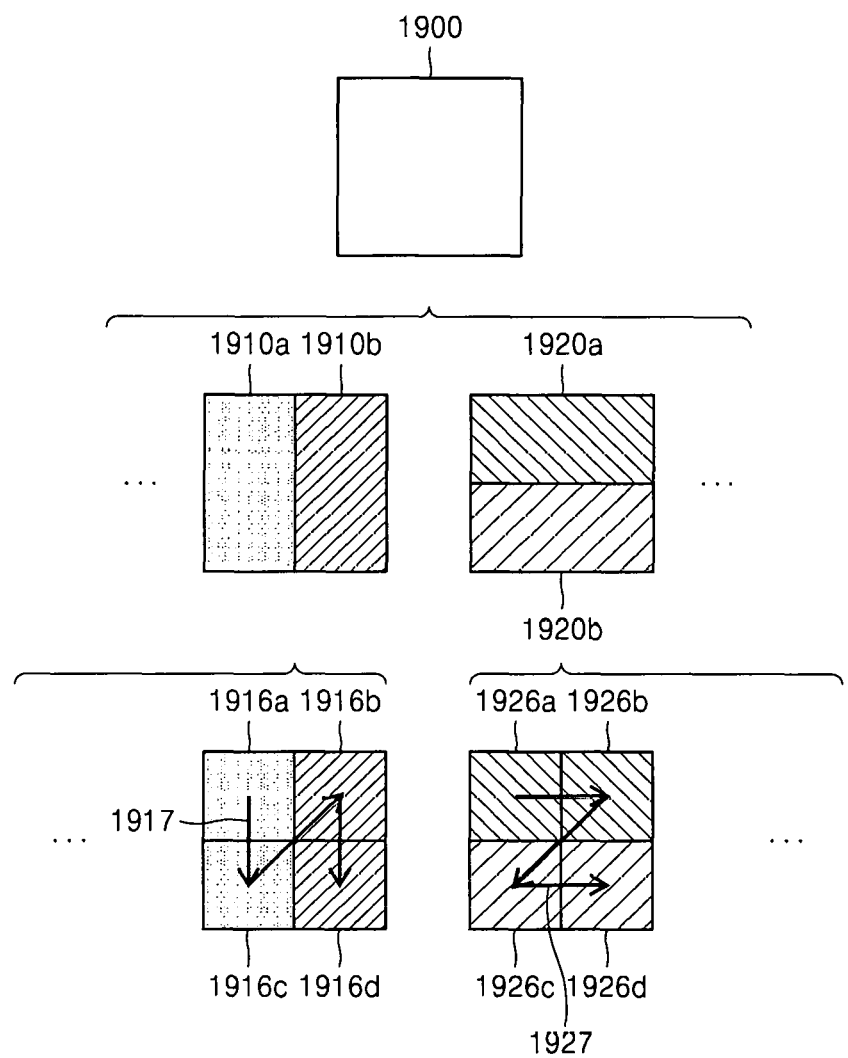
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the image decoding apparatus 100 may split a first coding unit 1900 based on block shape information and split shape information. When the block shape information indicates a square shape and the split shape information indicates that the first coding unit 1900 is split in at least one of a horizontal direction and a vertical direction, the image decoding apparatus 100 may split the first coding unit 1900 to determine second coding units 1910*a* and 1910*b*, or 1920*a* and 1920*b*. Referring to FIG. 19, the second coding units 1910*a* and 1910*b*, or 1920*a* and 1920*b* having a non-square shape and determined when the first coding unit 1900 is split in the horizontal direction or the vertical direction may each be independently split based on block shape information and split shape information. For example, the image decoding apparatus 100 may determine third coding units 1916*a* through 1916*d* by splitting, in the horizontal direction, each of the second coding units 1910*a* and 1910*b* generated as the first coding unit 1900 is split in the vertical direction, or determine third coding units 1926*a* through 1926*d* by splitting, in the vertical direction, the second coding units 1920*a* and 1920*b* generated as the first coding unit 1900 is split in the horizontal direction. Processes of splitting the second coding units 1910*a* and 1910*b*, or 1920*a* and 1920*b* have been described above with reference to FIG. 17, and thus details thereof are not provided again.

According to an embodiment, the image decoding apparatus 100 may process coding units according to a certain order. Features about processing coding units according to a certain order have been described above with reference to FIG. 14, and thus details thereof are not provided again. Referring to FIG. 19, the image decoding apparatus 100 may determine four third coding units 1916*a* through 1916*d* or 1926*a* through 1926*d* having a square shape by splitting the first coding unit 1900 having a square shape. According to an embodiment, the image decoding apparatus 100 may determine an order of processing the third coding units 1916*a* through 1916*d* or 1926*a* through 1926*d* based on how the first coding unit 1900 is split.

According to an embodiment, the image decoding apparatus 100 may determine the third coding units 1916*a* through 1916*d* by splitting, in the horizontal direction, the second coding units 1910*a* and 1910*b* generated as the first coding unit 1900 is split in the vertical direction, and process the third coding units 1916*a* through 1916*d* according to an order 1917 of first processing, in the vertical direction, the third coding units 1916*a* and 1916*b* included in the second coding unit 1910*a* at the left, and then processing, in the vertical direction, the third coding units 1916*c* and 1916*d* included in the second coding unit 1910*b* at the right.

According to an embodiment, the image decoding apparatus 100 may determine the third coding units 1926*a* through 1926*d* by splitting, in the vertical direction, the second coding units 1920*a* and 1920*b* generated as the first coding unit 1900 is split in the horizontal direction, and process the third coding units 1926*a* through 1926*d* according to an order 1927 of first processing, in the horizontal direction, the third coding units 1926*a* and 1926*b* included in the second coding unit 1920*a* at the top, and then processing, in the horizontal direction, the third coding units 1926*c* and 1926*d* included in the second coding unit 1920*b* at the bottom.

Referring to FIG. 19, the third coding units 1916*a* through 1916*d* or 1926*a* through 1926*d* having a square shape may be determined when the second coding units 1910*a* and 1910*b*, or 1920*a* and 1920*b* are each split. The second coding units 1910*a* and 1910*b* determined when the first coding unit 1900 is split in the vertical direction and the second coding units 1920*a* and 1920*b* determined when the first coding unit 1900 is split in the horizontal direction are split in different shapes, but according to the third coding units 1916*a* through 1916*d* and 1926*a* through 1926*d* determined afterwards, the first coding unit 1900 is split in coding units having same shapes. Accordingly, the image decoding apparatus 100 may process pluralities of coding units determined in same shapes in different orders even when the coding units having the same shapes are consequently determined when coding units are recursively split through different processes based on at least one of block shape information and split shape information.

FIG. 20 illustrates processes of determining a depth of a coding unit as a shape and size of the coding unit are changed, when a plurality of coding units are determined when the coding unit is recursively split, according to an embodiment.

According to an embodiment, the image decoding apparatus 100 may determine a depth of a coding unit according to a certain standard. For example, the certain standard may be a length of a long side of the coding unit. When a length of a long side of a current coding unit is split 2n times shorter than a length of a long side of a coding unit before being split, it may be determined that a depth of the current coding unit is increased n times a depth of the coding unit before being split, wherein n>0. Hereinafter, a coding unit having an increased depth is referred to as a coding unit of a lower depth.

Referring to FIG. 20, the image decoding apparatus 100 may determine a second coding unit 2002 and a third coding unit 2004 of lower depths by splitting a first coding unit 2000 having a square shape, based on block shape information indicating a square shape (for example, block shape information may indicate '0:SQURE'), according to an embodiment. When a size of the first coding unit 2000 having a square shape is 2N×2N, the second coding unit 2002 determined by splitting a width and a height of the first coding unit 2000 by 1/21 may have a size of N×N. In addition, the third coding unit 2004 determined by splitting a width and a height of the second coding unit 2002 by ½ may have a size of N/2×N/2. In this case, a width and a height of the third coding unit 2004 corresponds to 1/22 of the first coding unit 2000. When a depth of first coding unit 2000 is D, a depth of the second coding unit 2002 having 1/21 of the width and the height of the first coding unit 2000 may be D+1, and a depth of the third coding unit 2004 having 1/22 of the width and the height of the first coding unit 2000 may be D+2.

According to an embodiment, the image decoding apparatus 100 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS_VER' indicating a non-square shape in which a height is longer than a width, or '2:NS_HOR' indicating a non-square shape in which a width is longer than a height), according to an embodiment.

The image decoding apparatus 100 may determine a second coding unit (for example, the second coding unit 2002, 2012, or 2022) by splitting at least one of a width and a height of the first coding unit 2010 having a size of N×2N. In other words, the image decoding apparatus 100 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

The image decoding apparatus 100 may determine a second coding unit (for example, the second coding unit 2002, 2012, or 2022) by splitting at least one of a width and a height of the first coding unit 2020 having a size of 2N×N. In other words, the image decoding apparatus 100 may determine the second coding unit 2002 having a size of N×N or the second coding unit 2012 having a size of N/2×N by splitting the first coding unit 2020 in a vertical direction, or determine the second coding unit 2022 having a size of N×N/2 by splitting the first coding unit 2010 in horizontal and vertical directions.

According to an embodiment, the image decoding apparatus 100 may determine a third coding unit (for example, the third coding unit 2004, 2014, or 2024) by splitting at least one of a width and a height of the second coding unit 2002 having a size of N×N. In other words, the image decoding apparatus 100 may determine the third coding unit 2004 having a size of N/2×N/2, the third coding unit 2014 having a size of N/22×N/2, or the third coding unit 2024 having a size of N/2×N/22 by splitting the second coding unit 2002 in vertical and horizontal directions.

According to an embodiment, the image decoding apparatus 100 may determine a third coding unit (for example, the third coding unit 2004, 2014, or 2024) by splitting at least one of a width and a height of the second coding unit 2022 having a size of N/2×N. In other words, the image decoding apparatus 100 may determine the third coding unit 2004 having a size of N/2×N/2 or the third coding unit 2024 having a size of N/2×N/22 by splitting the second coding unit 2012 in a horizontal direction, or the third coding unit 2014 having a size of N/22×N/2 by splitting the second coding unit 2012 in vertical and horizontal directions.

According to an embodiment, the image decoding apparatus 100 may determine a third coding unit (for example, the third coding unit 2004, 2014, or 2024) by splitting at least one of a width and a height of the second coding unit 2022 having a size of N×N/2. In other words, the image decoding apparatus 100 may determine the third coding unit 2004 having a size of N/2×N/2 or the third coding unit 2014 having a size of N/22×N/2 by splitting the second coding unit 2022 in a vertical direction, or the third coding unit 2024 having a size of N/2×N/22 by splitting the second coding unit 2022 in vertical and horizontal directions.

According to an embodiment, the image decoding apparatus 100 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined when the first coding unit 2000 having a size of 2N×2N is split in a horizontal or vertical direction may be the same as a depth of the first coding unit 2000.

According to an embodiment, the width and the height of the third coding unit 2014 or 2024 may be 1/22 of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is 1/22 of the width and the height of the first coding unit 2010 or 202 may be D+2.

Figure 21:
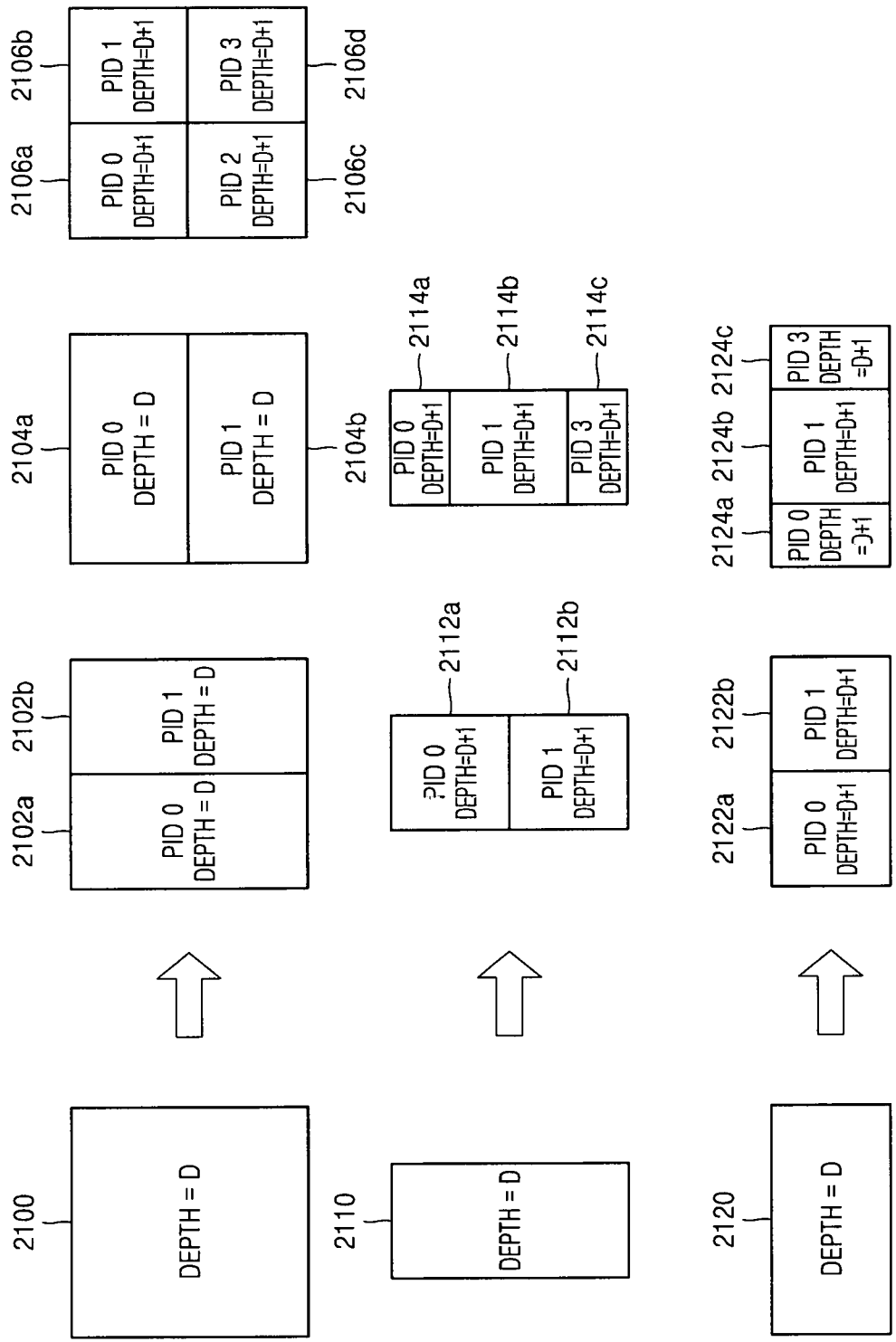
FIG. 21 illustrates a part index (PID) for distinguishing depths and coding units, which may be determined according to shapes and sizes of coding units, according to an embodiment.

FIG. 21 illustrates a part index (PID) for distinguishing depths and coding units, which may be determined according to shapes and sizes of coding units, according to an embodiment.

According to an embodiment, the image decoding apparatus 100 may determine a second coding unit having various shapes by splitting a first coding unit 2100 having a square shape. Referring to FIG. 21, the image decoding apparatus 100 may determine second coding units 2102*a* and 2102*b*, 2104*a* and 2104*b*, or 2106*a* through 2106*d* by splitting the first coding unit 2100 in at least one of a vertical direction and a horizontal direction, according to split shape information. In other words, the image decoding apparatus 100 may determine the second coding units 2102*a* and 2102*b*, 2104*a* and 2104*b*, or 2106*a* through 2106*d* based on split shape information of the first coding unit 2100.

According to an embodiment, a depth of the second coding units 2102*a* and 2102*b*, 2104*a* and 2104*b*, or 2106*a* through 2106*d* determined according to the split shape information of the first coding unit 2100 having a square shape may be determined based on a length of a long side. For example, since a length of one side of the first coding unit 2100 having a square shape is the same as a length of a long side of the second coding units 2102*a* and 2102*b* or 2104*a* and 2104*b* having a non-square shape, the depths of the first coding unit 2100 and the second coding units 2102*a* and 2102*b* or 2104*a* and 2104*b* having a non-square shape may be the same, i.e., D. On the other hand, when the image decoding apparatus 100 splits the first coding unit 2100 into the four second coding units 2106*a* through 2106*d* having a square shape, based on the split shape information, a length of one side of the second coding units 2106a through 2106d having a square shape is ½ of the length of one side of the first coding unit 2100, the depths of the second coding units 2106a through 2106d may be D+1, i.e., a depth lower than the depth D of the first coding unit 2100.

According to an embodiment, the image decoding apparatus 100 may split a first coding unit 2110, in which a height is longer than a width, in a horizontal direction into a plurality of second coding units 2112a and 2112b or 2114a through 2114c, according to split shape information. According to an embodiment, the image decoding apparatus 100 may split a first coding unit 2120, in which a width is longer than a height, in a vertical direction into a plurality of second coding units 2122a and 2122b or 2124a through 2124c, according to split shape information.

According to an embodiment, depths of the second coding units 2112a and 2112b, 2114a through 2114c, 2122a and 2122b, or 2124a through 2124c determined according to the split shape information of the first coding unit 2110 or 2120 having a non-square shape may be determined based on a length of a long side. For example, since a length of one side of the second coding units 2112a and 2112b having a square shape is 1/2 of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the image decoding apparatus 100 may split the first coding unit 2110 having a non-square shape into an odd number of second coding units 2114a through 2114c, based on split shape information. The odd number of second coding units 2114a through 2114c may include the second coding units 2114a and 2114c having a non-square shape, and the second coding unit 2114b having a square shape. In this case, since a length of a long side of the second coding units 2114a and 2114c having a non-square shape and a length of one side of the second coding unit 2114b having a square shape are 1/2 of a length of one side of the first coding unit 2110, depths of the second coding units 2114a through 2114b may be D+1, i.e., a depth lower than the depth D of the first coding unit 2110. The image decoding apparatus 100 may determine depths of coding units related to the first coding unit 2120 having a non-square shape in which a width is longer than a height, in the same manner as the determining of depths of coding units related to the first coding unit 2110.

According to an embodiment, with respect to determining PIDs for distinguishing coding units, when an odd number of coding units do not have the same size, the image decoding apparatus 100 may determine PIDs based on a size ratio of the coding units. Referring to FIG. 21, the second coding unit 2114b located at the center from the odd number of second coding units 2114a through 2114c may have the same width as the second coding units 2114a and 2114c, but have a height twice higher than those of the second coding units 2114a and 2114c. In this case, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID having increased by 2. In other words, values of the PID may be discontinuous. According to an embodiment, the image decoding apparatus 100 may determine whether an odd number of coding units have the same sizes based on discontinuity of PID for distinguishing the coding units.

According to an embodiment, the image decoding apparatus 100 may determine whether a plurality of coding units determined when a current coding unit is split have certain split shapes based on values of PID. Referring to FIG. 21, the image decoding apparatus 100 may determine the even number of second coding units 2112a and 211b or the odd number of second coding units 2114a through 2114c by splitting the first coding unit 2110 having a rectangular shape in which the height is longer than the width. The image decoding apparatus 100 may use the PID indicating each coding unit so as to distinguish a plurality of coding units. According to an embodiment, a PID may be obtained from a sample at a certain location (for example, an upper left sample) of each coding unit.

According to an embodiment, the image decoding apparatus 100 may determine a coding unit at a certain location from among coding units determined by using PIDs for distinguishing coding units. According to an embodiment, when split shape information of the first coding unit 2110 having a rectangular shape in which a height is longer than a width indicates that the first coding unit 2110 is split into three coding units, the image decoding apparatus 100 may split the first coding unit 2110 into the three second coding units 2114a through 2114c. The image decoding apparatus 100 may assign a PID to each of the three second coding units 2114a through 2114c. The image decoding apparatus 100 may compare PIDs of an odd number of coding units so as to determine a center coding unit from among the coding units. The image decoding apparatus 100 may determine, as a coding unit at a center location from among coding units determined when the first coding unit 2110 is split, the second coding unit 2114b having a PID corresponding to a center value from among PIDs, based on PIDs of the coding units. According to an embodiment, while determining PIDs for distinguishing coding units, when the coding units do not have the same sizes, the image decoding apparatus 100 may determine PIDs based on a size ratio of the coding units. Referring to FIG. 21, the second coding unit 2114b generated when the first coding unit 2110 is split may have the same width as the second coding units 2114a and 2114c, but may have a height twice higher than those of the second coding units 2114a and 2114c. In this case, when the PID of the second coding unit 2114b located at the center is 1, the PID of the second coding unit 2114c in a next order may be 3, the PID having increased by 2. As such, when an increasing range of PIDs differs while uniformly increasing, the image decoding apparatus 100 may determine that a current coding unit is split into a plurality of coding units including a coding unit having a different size from other coding units. According to an embodiment, when split shape information indicates splitting into an odd number of coding units, the image decoding apparatus 100 may split a current coding unit into a plurality of coding units, in which a coding unit at a certain location (for example, a center coding unit) has a size different from other coding units. In this case, the image decoding apparatus 100 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the image decoding apparatus 100 may use a certain data unit from which recursive splitting of a coding unit is started.

Figure 22:
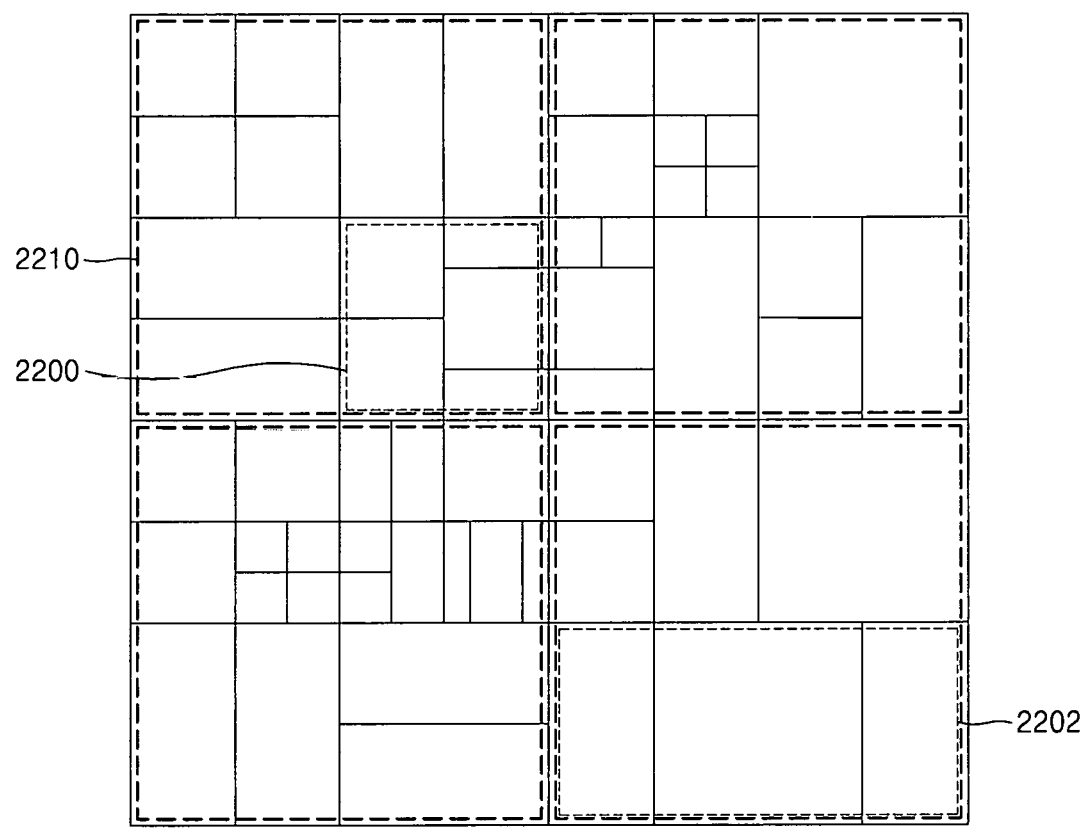
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split shape information. In other words, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, the reference data unit may include M×N samples. Here, M and N may be the same, and may be an integer expressed as a multiple of 2. In other words, a reference data unit may indicate a square shape or a non-square shape and may later be split into an integer number of coding units.

According to an embodiment, the image decoding apparatus 100 may split a current picture into a plurality of reference data units. According to an embodiment, the image decoding apparatus 100 may split the plurality of reference data units obtained by splitting the current picture by using split information about each of the reference data units. Split processes of such reference data units may correspond to split processes using a quad-tree structure.

According to an embodiment, the image decoding apparatus 100 may pre-determine a smallest size available for the reference data unit included in the current picture. Accordingly, the image decoding apparatus 100 may determine the reference data unit having various sizes that are equal to or larger than the smallest size and determine at least one coding unit based on the determined reference data unit by using block shape information and split shape information.

Referring to FIG. 22, the image decoding apparatus 100 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the receiver of the image decoding apparatus 100 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2200 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the image decoding apparatus 100 may use a PID for distinguishing the size and shape of the reference coding unit. In other words, the receiver may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding apparatus 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. In other words, the image decoding apparatus 100 may select at least one of the pre-determined size and shape of the reference coding unit according to the PID so as to determine at least one of the size and shape of the reference coding unit included in a data unit that is a criterion for obtaining the PID.

According to an embodiment, the image decoding apparatus 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the image decoding apparatus 100 may determine a reference coding unit by splitting a largest coding unit n times according to a quad-tree structure and split the reference coding unit based on at least one of block shape information and split shape information according to various embodiments.

Figure 23:
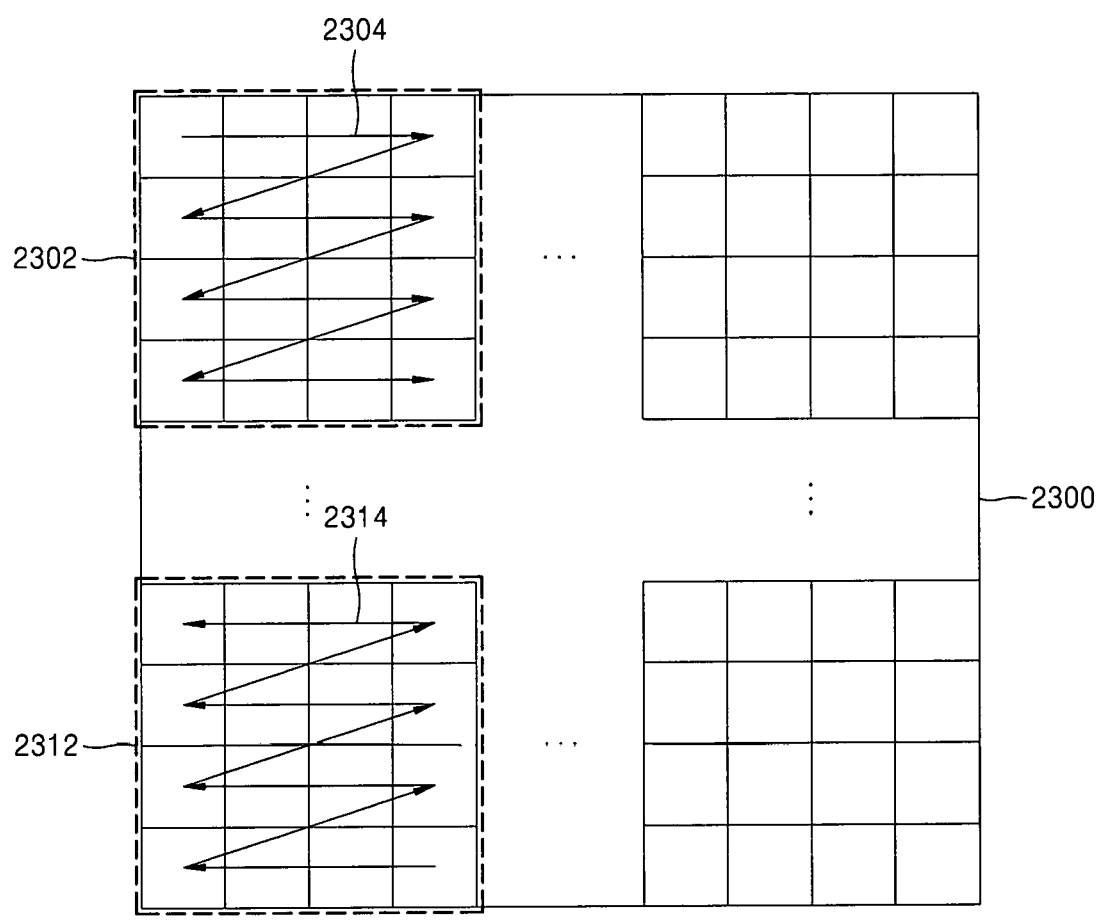
FIG. 23 illustrates a processing block serving as a criterion of determining a determination order of reference coding units included in a picture, according to an embodiment.

FIG. 23 illustrates a processing block serving as a criterion of determining a determination order of reference coding units included in a picture 2300, according to an embodiment.

According to an embodiment, the image decoding apparatus 100 may determine at least one processing block splitting a picture. A processing block is a data unit including at least one reference coding unit splitting an image, and the at least one reference coding unit included in the processing block may be determined in a certain order. In other words, a determining order of the at least one reference coding unit determined in each processing block may correspond to one of various orders for determining a reference coding unit and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted with respect to the scan orders.

According to an embodiment, the image decoding apparatus 100 may determine a size of at least one processing block included in an image by obtaining information about a size of a processing block. The image decoding apparatus 100 may obtain, from a bitstream, the information about a size of a processing block to determine the size of the at least one processing block included in the image. The size of the processing block may be a certain size of a data unit indicated by the information about a size of a processing block.

According to an embodiment, the receiver of the image decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the receiver may obtain, from the bitstream, the information about a size of a processing block according to such several data units, and the image decoding apparatus 100 may determine the size of at least one processing block splitting the picture by using the obtained information about a size of a processing block, wherein the size of the processing block may be an integer times a size of a reference coding unit.

According to an embodiment, the image decoding apparatus 100 may determine sizes of processing blocks 2302 and 2312 included in the picture 2300. For example, the image decoding apparatus 100 may determine a size of a processing block based on information about a size of a processing block, the information being obtained from a bitstream. Referring to FIG. 23, the image decoding apparatus 100 may determine horizontal sizes of the processing blocks 2302 and 2312 to be four times a horizontal size of a reference coding unit, and a vertical size thereof to be four times a vertical size of the reference coding unit, according to an embodiment. The image decoding apparatus 100 may determine a determining order of at least one reference coding unit in at least one processing block.

According to an embodiment, the image decoding apparatus 100 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining a size of the reference coding unit.

According to an embodiment, the image decoding apparatus 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 100 may obtain, from a bitstream, information about a determining order of a reference coding unit according to certain data units. For example, the receiver may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the receiver may obtain, from the bitstream, information about a determining order of a reference, coding unit, as information related to the processing blocks 2302 and 2312, and the image decoding apparatus 100 may determine an order of determining at least one reference coding unit included in the processing blocks 2302 and 2312 and determine at least one reference coding unit included in the picture 2300 according to a determining order of a coding unit. Referring to FIG. 23, the image decoding apparatus 100 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand when the determining order 2314 related to the processing block 2312 is an inverse order of a raster scan order, reference coding units included in the processing block 2312 may be determined in the inverse order of the raster scan order.

The image decoding apparatus 100 may decode determined at least one reference coding unit, according to an embodiment. The image decoding apparatus 100 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or split shape information indicating a method of splitting the current coding unit. The block shape information or the split shape information may be included in a bitstream related to various data units. For, example, the image decoding apparatus 100 may use the block shape information or split shape information, which is included in a sequence parameter set, a picture parameter set, a video parameter set, a slice header, and a slice segment header. In addition, the image decoding apparatus 100 may obtain, from a bitstream, and use syntax corresponding to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general use digital computers that execute the programs using a computer readable recording medium. Examples of the computer readable recording medium include magnetic storage media (e.g., ROM, floppy disks, hard disks, etc.), optical recording media (e.g., CD-ROMs or DVDs), etc.

The invention claimed is:

1. A method of decoding an image, the method comprising:
   obtaining, from a bitstream, first information indicating whether a planar mode is used;
   when the first information indicates that the planar mode is not used, obtaining, from the bitstream, second information indicating at least one most probable mode to be used in determining an intra prediction mode of a current block; and
   decoding the image according to the intra prediction mode determined by using the second information,
   wherein the at least one most probable mode is determined by referring to an intra prediction mode performed in a block adjacent of the current block.

* * * * *